US012139954B2

(12) United States Patent
Curtis et al.

(10) Patent No.: US 12,139,954 B2
(45) Date of Patent: Nov. 12, 2024

(54) FENESTRATION AUTOMATED OPERATING SYSTEM AND METHODS FOR SAME

(71) Applicant: Marvin Lumber and Cedar Company, LLC, Eagan, MN (US)

(72) Inventors: Daniel Jon Curtis, Warroad, MN (US); Justin Wayne Magnusen, Roosevelt, MN (US); Brian Michael Farnes, Warroad, MN (US)

(73) Assignee: Marvin Lumber and Cedar Company, LLC, Eagan, MN (US)

( * ) Notice: Subject to any disclaimer, the term of this patent is extended or adjusted under 35 U.S.C. 154(b) by 0 days.

(21) Appl. No.: 18/167,626

(22) Filed: Feb. 10, 2023

(65) Prior Publication Data

US 2023/0250685 A1 Aug. 10, 2023

Related U.S. Application Data

(60) Provisional application No. 63/267,835, filed on Feb. 10, 2022.

(51) Int. Cl.
*E05F 15/71* (2015.01)
*E05F 15/53* (2015.01)
(Continued)

(52) U.S. Cl.
CPC ............ *E05F 15/619* (2015.01); *E05F 15/53* (2015.01); *E05F 15/622* (2015.01); *E05F 15/71* (2015.01); *E05Y 2201/20* (2013.01); *E05Y 2201/694* (2013.01); *E05Y 2201/702* (2013.01); *E05Y 2400/3013* (2024.05); *E05Y 2400/40* (2013.01); *E05Y 2400/80* (2013.01); *E05Y 2800/122* (2013.01); *E05Y 2800/232* (2013.01); *E05Y 2800/36* (2013.01); *E05Y 2800/426* (2013.01); *E05Y 2900/148* (2013.01)

(58) Field of Classification Search
CPC ......... E05F 15/53; E05F 15/611; E05F 15/70; E05F 15/72
See application file for complete search history.

(56) References Cited

U.S. PATENT DOCUMENTS 6,915,608 B2 * 7/2005 Labarre .................. E05F 15/63 49/140
9,689,190 B2 * 6/2017 Wu ........................ G08B 13/08
(Continued)

OTHER PUBLICATIONS

"Canadian Application Serial No. 3,189,674, Office Action mailed May 29, 2024", 3 pgs.

*Primary Examiner* — Matthew W Ing
*Assistant Examiner* — Susan M. Heschel
(74) *Attorney, Agent, or Firm* — Schwegman Lundberg & Woessner, P.A.

(57) ABSTRACT

A fenestration automated operating system includes a fenestration frame, fenestration panel and one or both of a panel operating assembly or a panel latch assembly. The panel operating assembly is coupled with one or both of the fenestration frame or the fenestration panel. The panel operating assembly includes a panel actuator coupled with the panel actuator. A panel latch assembly is coupled with one or both of the fenestration frame or the fenestration panel. The panel latch assembly includes a latch and a latch actuator coupled with the latch. A fenestration controller is configured to operate each of the latch actuator and the panel actuator.

34 Claims, 12 Drawing Sheets

(51) Int. Cl.
*E05F 15/619* (2015.01)
*E05F 15/622* (2015.01)

(56) References Cited

U.S. PATENT DOCUMENTS

| | | | | |
|---|---|---|---|---|
| 10,221,607 | B2 * | 3/2019 | Gramstad | E05C 9/14 |
| 10,760,317 | B2 * | 9/2020 | Guelck | E05C 17/24 |
| 10,930,124 | B2 * | 2/2021 | Farnes | G08B 25/008 |
| 11,719,037 | B2 * | 8/2023 | Farnes | E04D 13/0325<br>454/196 |
| 2008/0000159 | A1 * | 1/2008 | Gilbert | E05D 15/30<br>49/345 |
| 2010/0270814 | A1 * | 10/2010 | Labarre | E05B 47/0012<br>292/144 |
| 2013/0198997 | A1 * | 8/2013 | Olson | E05D 15/30<br>16/364 |
| 2019/0309561 | A1 * | 10/2019 | Hall | E05F 15/73 |

* cited by examiner

FENESTRATION AUTOMATED OPERATING SYSTEM AND METHODS FOR SAME

CLAIM OF PRIORITY

This application claims priority to U.S. Provisional Patent Application Ser. No. 63/267,835, filed Feb. 10, 2022, which is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to any software and data as described below and in the drawings that form a part of this document: Copyright Marvin Lumber and Cedar Company, LLC d/b/a Marvin Windows and Doors of Warroad, Minnesota All Rights Reserved.

TECHNICAL FIELD

This document pertains generally, but not by way of limitation, to fenestration hardware for one or more of securing and operating a fenestration assembly.

BACKGROUND

Fenestration assemblies include one or more of door and window assemblies that provide access. For example, fenestration assemblies include fenestration frames and fenestration panels. Fenestration panels, such as doors, sashes or the like, are usually (but not always) movably coupled with fenestration frames to provide access (e.g., entry and exit through the assembly, ventilation or the like).

Fenestration assemblies include latches and operation hardware that permit securing and opening or closing of the assemblies. For instance, latches secure fenestration panels in a closed position and minimize unauthorized opening of the assemblies (e.g., by intruders, inclement weather, children or the like). The latches are operable, for example with manual operators, to permit human manipulation of the latches to lock and unlock (secure and unsecure) the fenestration assemblies.

In other examples, fenestration assemblies include operation hardware to facilitate opening and closing of fenestration assemblies. For instance, balance systems, counterweights, casement mechanisms or the like are installed with fenestration assemblies, like windows, to assist with opening and closing. The operation hardware optionally supports some of the weight of the fenestration panel, and is used by a homeowner, worker or the like to conduct closing and opening movement of the fenestration assembly. In a casement or awning fenestration assembly having a rotatable window sash, the operation hardware supports the sash, promotes movement of the sash (when operated), and guides movement of the sash toward open or closed positions and intermediate positions therebetween.

Optionally, fenestration assemblies are offered with powered hardware that operate one or more of the latches or operation hardware. For instance, the powered hardware is attached to a fenestration assembly operation hardware, latch or the like to permit remote operation of the fenestration assembly. In some examples, the powered hardware is a distinct component with its own housing that is coupled to the fenestration assembly (e.g., over the fenestration frame). The powered hardware is configured to operate a latch, move the fenestration panel or the like.

SUMMARY

The present inventors have recognized, among other things, that a problem to be solved includes maintaining the capability to conduct manual operation of fenestration assembly latches and operation hardware while at the same time providing powered control of the latches and operation hardware. For example, systems including powered hardware couple the hardware with the fenestration assembly latching, operation hardware or both to remotely control the fenestration assembly latching and operation (e.g., opening and closing). The powered hardware is installed, in some examples, in a manner that intimately connects the hardware with the window and makes manual operation of either or both of the latches or operation hardware difficult. For instance, powered actuators are coupled with one or more of the latches, operation hardware (e.g., mechanisms) or the like. The actuators include various mechanical and electrical components that, when not operated, interfere with manual operation of the latches and operation hardware because of their mechanism type, the desire for fenestration security or both. For instance, motors, mechanisms or the like coupled with latches and operation hardware resist outside forces. The motors or mechanisms move when powered, but otherwise maintain their present configuration (or resist movement from the present configuration) when unpowered. For instance, a closed and locked window remains locked and closed as specified when the powered hardware was last operated. Manual operation is, in many circumstances, unable to unlock or move the fenestration panel because of the powered hardware (e.g., to maintain security, because of the mechanism type or the like).

However, in some situations manual operation is specified and useful. For instance, in a power failure manual operation of the fenestration assembly latches and operation hardware is helpful to facilitate egress, ventilation, closure of the fenestration assembly or the like. In other situations, manual operation is desired to provide access through or closure of a fenestration assembly in an emergent situation where powered hardware is without power, the control interface (e.g., a smartphone, control pad or the like) is unavailable or the like. With inclement weather, closing and latching of a fenestration assembly may be specified and manual operation needed where the control interface is not available. Similarly, in a home or building fire rapid manual operation of the latches and operation hardware may be specified to facilitate egress from the home or building. In other examples, the powered hardware may fail and manual operation is helpful to continue access through the fenestration assembly until maintenance of the powered hardware is conducted.

In other examples, powered hardware is installed to a fenestration assembly in a manner that detracts from the appeal of the assembly. For instance, the powered hardware is installed over or along a portion of the frame and is readily visible, or interferes with the daylight opening of the fenestration assembly. In one example, the powered hardware has a distinct housing that is installed to the fenestration assembly and projects (at least partially) from the fenestration frame thereby disrupting the fenestration profile of the fenestration assembly. The interruption of the fenestration profile is another example of a problem recognized by the present inventors.

The present subject matter can help provide a solution to this problem, such as by providing one or more fenestration automated operation assemblies that conduct powered functions of the fenestration assemblies while at the same time permitting manual operation of the assemblies. The fenestration automated operating system in a first embodiment includes a panel operating assembly having a panel actuator (e.g., screw drive, cylinder and piston or the like) coupled with a power source, such as a motor. The panel actuator is coupled between the fenestration frame and the fenestration panel. Actuation of the panel actuator, for instance with remote controls, moves the fenestration panel between open, closed and intermediate positions. The panel operating assembly, for instance the power source and the panel actuator, are within the fenestration frame. For instance, the panel operating assembly fits within a fenestration profile of the fenestration assembly and does not interrupt the profile.

Additionally, the panel operating assembly includes a panel shoe that interconnects the panel actuator with one of the fenestration panel or the fenestration frame and permits manual operation of the fenestration assembly. The panel shoe includes anchored and movable configurations. In the anchored configuration the panel shoe is coupled with the fenestration panel and constrained to limited or no movement (e.g., is statically coupled). In the movable configuration the panel shoe is decoupled from the fenestration panel and movable relative to the panel. For example, the fenestration panel includes a shoe track having an anchor socket that receives a shoe anchor of the panel shoe. In the movable configuration the shoe anchor is decoupled from the anchor socket and the panel shoe may move freely along the shoe track. Accordingly, manual force applied to the fenestration panel readily moves the panel with minimal (e.g., no or decreased) resistance by the panel actuator. In another example, the anchor socket includes a manual tolerance slot that includes sufficient manual tolerance to permit limited movement of the fenestration panel in the anchored configuration (in comparison to the movable configuration). The manual tolerance allows a user to move the fenestration panel a limited amount, for instance to expose a release operator of the panel shoe that toggles the shoe anchor between the anchored and movable configurations. When exposed, the operator may toggle the shoe anchor to the movable configuration to readily permit further manual opening or closing movement of the fenestration panel.

The fenestration automated operating system in a second embodiment includes a panel latch assembly having a latch actuator (e.g., screw drive, cylinder and piston or the like) coupled with a power source, such as a source of motive power. The latch actuator is coupled with one or more latches of the fenestration assembly. In one example, the latch actuator is coupled with a tie bar coupled between a plurality of latches. Actuation of the latch actuator (e.g., with remote controls) moves the one or more latches between secure and unsecured positions. The panel latch assembly, for instance the power source and the latch actuator, are within the fenestration frame. For instance, the panel latch assembly fits within a fenestration profile of the fenestration assembly and does not interrupt the profile.

Additionally, the panel latch assembly includes a shuttle, such as a tie bar having latching and unlatching lugs spaced apart (a shuttle track), that interconnects the latch actuator with the one or more latches and permits manual operation of the latches. The shuttle includes a shuttle track with one or more engagement surfaces, such as the latching and unlatching lugs. At least one of the latch actuator (such as a drive lug of the latch actuator) or the latch are movably coupled relative to the shuttle track. Movement of the latch actuator is transmitted through the drive lug to the latch to accordingly move the latch between the secure and unsecured configurations.

With the latch in the secured position the drive lug of the latch actuator is, in one example, disengaged from the one or more engagement surfaces (e.g., lugs) of the shuttle track (e.g., the space between lugs along the tie bar). With the disengagement the tie bar and the latches are manually movable relative to the disengaged latch actuator. For instance, the drive lug of the latch actuator is back driven (e.g., a powered or actuated back drive) away from the lugs along the shuttle track after the latch is secured to disengage the drive lug from the one or more engagement surfaces (the latching or unlatching lugs). In an example, the back driving provides a shuttle track tolerance. The panel latch assembly includes a manual operator, such as a lever, handle or the like, coupled with the one or more latches. Because the latch actuator is spaced with the shuttle track tolerance the manual operator is freely permitted to operate the one or more latches (e.g., to move to the unsecured position) without resistance from the latch actuator.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1A:
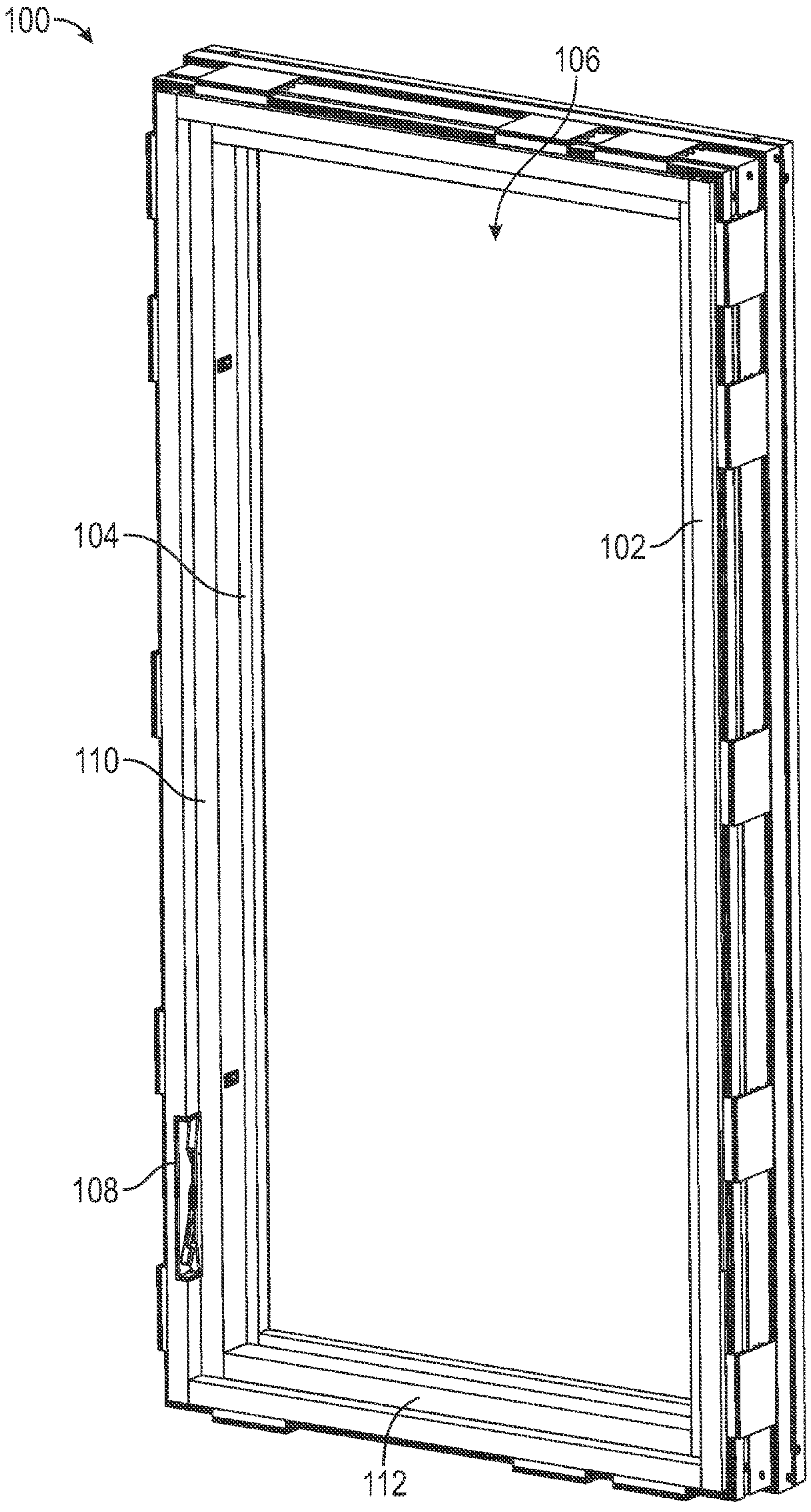
FIG. 1A is a perspective view of one example of a fenestration assembly in a closed configuration.

FIG. 1A is a perspective view of one example of a fenestration assembly 100 in a closed configuration. The fenestration assembly 100 includes one or more of a window assembly, door assembly or the like. In this example, the fenestration assembly 100 includes a fenestration panel 104 moveably coupled with a fenestration frame 102. The fenestration assembly 100 includes, but is not limited to, one or more of a casement, awning, double hung, single hung window assemblies or the like. As shown in FIG. 1A, the fenestration panel 104 includes a pane 106 including, such as, a translucent panel of glass, polymer or the like provided therein.

As further shown in FIG. 1A, the fenestration assembly 100, in this example, includes a manual operator 108 to permit manual latching and unlatching of the fenestration panel 104 (also referred to as secured and unsecured). As described herein, the fenestration assembly 100 includes one or more electrically or mechanically driven features configured to, for instance, operate the latch assembly of the fenestration assembly 100 in an automated manner (e.g., powered, motorized or the like) without manual user interaction. In other examples, the fenestration assembly 100 includes one or more panel actuators that automatically move (e.g., are powered, motorized or the like) the fenestration panel 104 in a powered manner between open and closed configurations including positions therebetween.

As shown in FIG. 1A one or more of these automated features are concealed within the fenestration panel 100 and minimize (e.g., decrease or eliminate) interference with the aesthetic appearance and profile of the fenestration assembly 100. For instance, as shown in FIG. 1A, the fenestration assembly 100 includes one or more of latch assembly shells 110 and operating assembly shells 112 configured to conceal one or more of the panel latching assembly, the panel operating assembly or the like including their associated actuators, mechanisms, components or the like. In one example, the latch assembly shell 110 and the operating assembly shell 112 (also referred to herein as concealment shells) provide a streamlined aesthetically pleasing look that blends with the remainder of the fenestration assembly 100 including one or more of the fenestration frame 102 and the fenestration panel 104. For example, the fenestration frame 102 provides a fenestration profile bounded by a header, sill, jambs, their associated fascia or the like. The various components of the panel latch assembly 204 and the panel operating assembly 400 fit within the fenestration profile and are concealed with the respective shells 110, 112 without interrupting the fenestration profile.

As provided herein, in various examples, the operating assembly shell 112, the latch assembly shell 110 or the like are, in various examples, selectively removeable from the fenestration assembly 100 to provide access to, maintenance of, replacement or the like of one or more of the panel latching assembly, panel operator assembly or the like. Additionally, the operating assembly shell 112 and the latch assembly shell 110 minimize tampering with the assemblies and interior components of the fenestration assembly 100.

Figure 2:
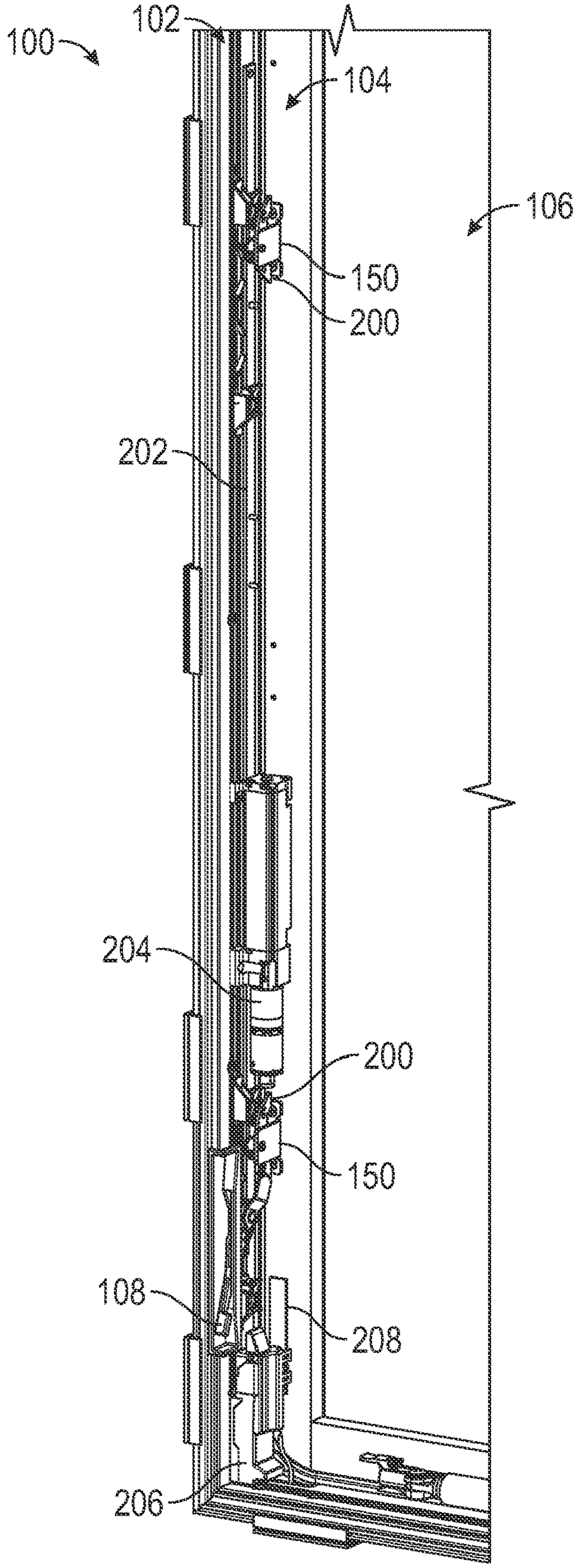
FIG. 2 is a detailed perspective view of an example of a panel latching assembly.

In other examples, the latch assembly shell 110, operating assembly shell 112 or the like are configured to conceal other components of the fenestration assembly 100 including, but not limited to, one or more of control modules such as the control module 206 shown in FIG. 2 as well as other control modules (referred to in some instances as a fenestration controller), interfaces such as CAN buses, buses, wireless transceivers or the like, wiring, power packs, hardware components or the like. When access to these components is desired, the one or more latch assembly shell 110, operating assembly shell 112 or the like are decoupled to provide access.

As previously discussed, the fenestration assembly 100 includes a manual operator 108 operates one or more latching, panel movement or the like in a manual alternative manner to the one or more automatic panel latch assemblies. In one example, the manual operator 108 couples with one or more mechanisms associated with the panel latch assembly to permit manual operation of the panel latch assembly and accordingly manually latch and unlatch the fenestration assembly 100. Manual operation is provided to ensure latching and unlatching are available in the event of a power outage, emergent situation (including an emergency), absence of a control interface (e.g., a mobile device or panel) or the like. Manual operation of the panel latch assembly permits manual opening of the fenestration panel 104, for instance with a manual crank, hand pushing and pulling or the like.

Figure 1B:
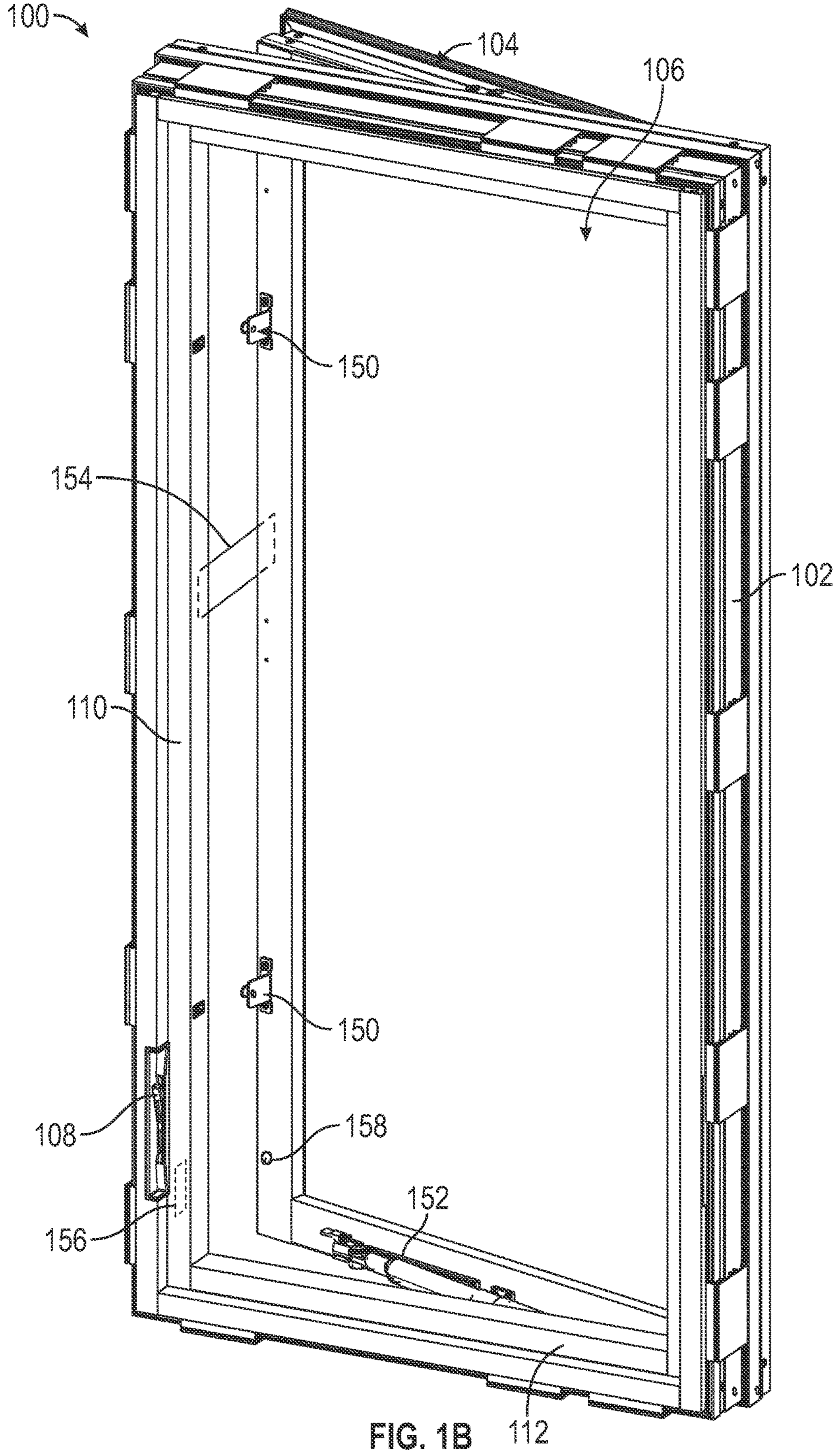
FIG. 1B is a perspective view of the fenestration assembly of FIG. 1A in an open configuration.

FIG. 1B shows another view of the fenestration assembly 100 in a partially open configuration, for instance, with the fenestration panel 104 rotates or pivoted relative to the remainder of the fenestration assembly 100 including the fenestration frame 102. In the example shown in FIG. 1B, the fenestration panel 104 is coupled with the fenestration frame 102 with a panel actuator 152 including, but not limited to, one or more of a pneumatic, electrical, electromechanical actuator or the like coupled between the fenestration frame 102 and the fenestration panel 104. In one example, the operating assembly shell 112 conceals the panel actuator 152 at least while the fenestration panel 104 is in the closed configuration shown in FIG. 1A. In another example, with the fenestration assembly 100 in the open configuration, the panel actuator 152 is revealed to permit interaction with the panel actuator 152 (e.g., for repair, replacement or the like) including decoupling of the panel actuator 152 for instance to facilitate manual opening and closing of the fenestration panel 104.

As further shown in FIG. 1B, the fenestration panel 104 includes one or more keepers 150. The keepers 150 selectively couple and decouple with one or more latches, moved with the manual operator 108 or automated components of the panel latch assembly 204 (see FIG. 2), to latch and unlatch the fenestration assembly 100.

In another example, the fenestration assembly 100 includes one or more window opening control devices 154. In one example, the window opening control devices 154 are coupled between the fenestration panel 104 and the fenestration frame 102 to prevent opening of the fenestration panel 104 beyond a specified distance or position (e.g., four inches or the like) relative to the fenestration frame 102. In various examples, the fenestration assembly 100 includes one or more window opening control devices 154 to accordingly provide redundancy along the fenestration assembly 100 to minimize accidental opening of the fenestration panel 104 beyond a specified distance.

In the example shown in FIG. 1B the fenestration panel 104 includes a breach sensor operator 158 as a component of a breach sensor 156. In one example, the breach sensor 156 detects opening or closing of the fenestration panel 104. Optionally, the breach sensor 156 cooperates with one or more control boxes, control modules or the like (collectively referred to as one or more fenestration controllers or control modules) to detect unpowered or manual opening of the fenestration assembly 100 when opening not specified, for instance, upon forced operation or opening of the fenestration panel 104 by an intruder or the like. In one example, the breach sensor 156 includes one or more of a light, ultrasound, radar sensor or the like configured to detect movement of the fenestration panel 104. In another example, the breach sensor 156 includes a magnetic or electrical contact sensor, and the breach sensor operator 158 includes a magnet, ferrous component, conductive component or the like detectable with the breach sensor 156. For instance, in one example, the breach sensor 156 includes a reed switch that moves the reed therein with movement of the breach sensor operator 158 relative to the breach sensor 156.

FIG. 2 is a detailed perspective view of a portion of the fenestration assembly 100 including, in this example, a panel latch assembly 204 having each of a manual operator 108 and one or more automated (e.g., motorized) features to operate the latches 200 shown in FIG. 2. The panel latch assembly 204 shown in FIG. 2 includes a motor, actuator mechanism or the like configured to automatically (e.g., in a powered manner) move the latches 200 relative to the keepers 150 of the fenestration panel 104 to transition the fenestration assembly 100 between latched and unlatched configurations (also referred to herein as secured and unsecured configurations).

As shown in FIG. 2, the latches 200 provided along the fenestration frame 102 are optionally coupled together with a tie bar 202. The tie bar 202 is coupled with one or more components of the panel latch assembly 204. Movement of the tie bar 202 correspondingly moves the latches 200 relative to the keepers 150 into coupled or decoupled positions. Decoupling of the latches 200, for instance with downward movement away from the keepers 150, permits opening of the fenestration panel 104 with the panel actuator 152 shown in FIG. 1B or by way of manual operation, for instance, with an operator pushing on the fenestration panel 104.

In another example, the manual operator 108, such as a lever, handle or the like, is coupled with the tie bar 202 and the latches 200 to permit manual operation of the latches 200, for instance, in an emergent situation (also referred to as an emergency), power outage, while a control interface (such as a mobile device, remote device, wall mounted controls or the like) is not available or the like. As described herein, the manual operator 108 is, in one example, configured to freely operate relative to the remainder of the panel latch assembly 204 in an unpowered situation. As discussed herein, the panel latch assembly 204 permits manual operation (in addition to automated operation, also referred to as powered operation herein) through the use of one or more of a shuttle track 314, manual tolerance configuration 316 (shown in FIG. 3A) or the like.

As further shown in FIG. 2, in one example, the fenestration assembly 100 includes one or more automated features with the panel latch assembly 204. A control module 206 is, in one example, configured to couple with the automated features of the panel latch assembly 204 and thereby controls latching and unlatching of the fenestration assembly 100. In one example, the control module 206 is coupled with the breach sensor 156 shown, for instance, in FIG. 1B. In another example, the control module 206 is coupled with an environmental sensor 208 provided with the fenestration assembly 100. In various examples, the environmental sensor 208 is configured to sense (e.g., detect, measure or both) one or more of moisture, wind or the like. In other examples, the environmental sensor is configured to sense one or more characteristics including, but not limited to, temperature, moisture (such as rain, humidity, snow, precipitation or the like), wind direction and speed, ambient light, natural light or the like. As provided herein, the control module 206 (as well as the control interface 804) includes a processor, memory, circuits or the like, and is an example of a fenestration controller. The control module 206, interprets signals from the environmental sensor 208, the breach sensor 156 or the like to accordingly automatically control latching and unlatching, and opening and closing of the fenestration assembly 100, for instance, with the panel latch assembly 204 and the panel actuator 152 (see FIG. 1). The control module 206, control interface 804 or the like (example fenestration controllers) optionally include a multitude of ports, fittings or the like to permit electrical or data coupling with the sensors, actuators or the like of the fenestration assembly 100. In other examples, the control module 206 and control interface 804 include a multitude of ports, fittings or the like to permit electrical or data coupling with additional sensors, actuators or the like, for instance to permit the inclusion of additional functions or features to the fenestration assembly 100. In one example, internet connectivity or power by ethernet is provided with a supplemental module coupled with one or both of the control module 206, control interface 804 or the like to facilitate power supply by way of ethernet, over the wire communication by ethernet or the like. In still other examples, the control module 206, control interface 804 or the like are coupled with, but not limited to, light modulating actuators (shades, louvers, blinds), a tinting controller, LED lighting controller or the like. The multiple ports or fittings provided with the module 206, interface 804 or the like permit the expansion of the fenestration assembly 100 to include these and other functions and capabilities.

Figure 3A:
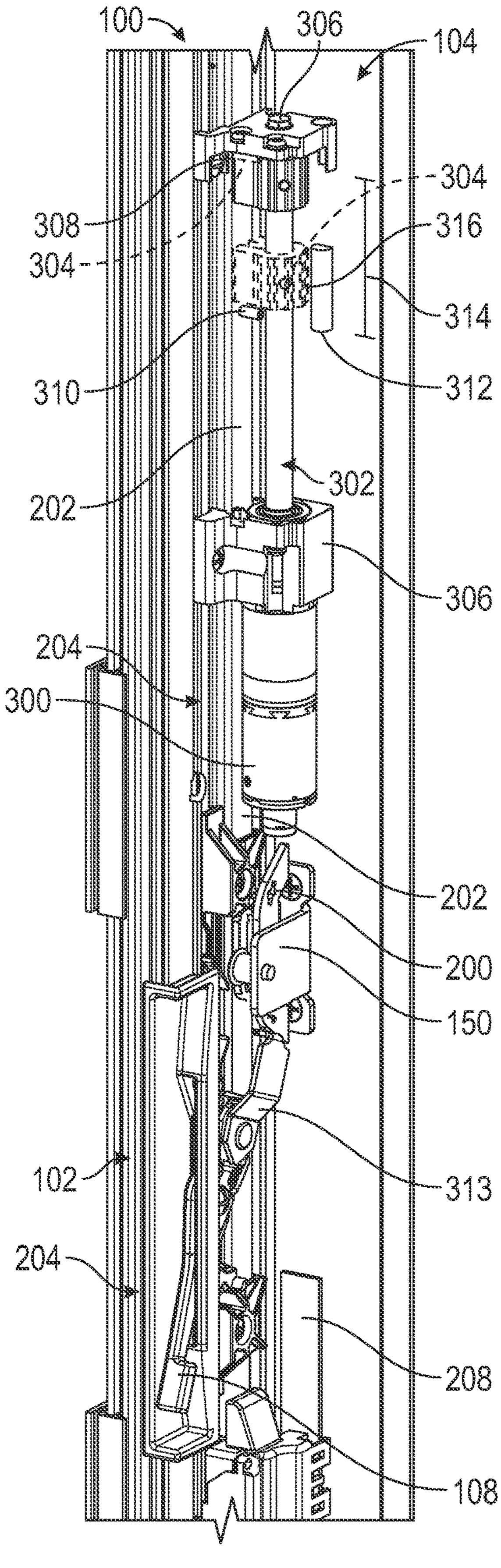
FIG. 3A is a detailed perspective view of the panel latching assembly of FIG. 2 in a latched configuration.
Figure 3B:
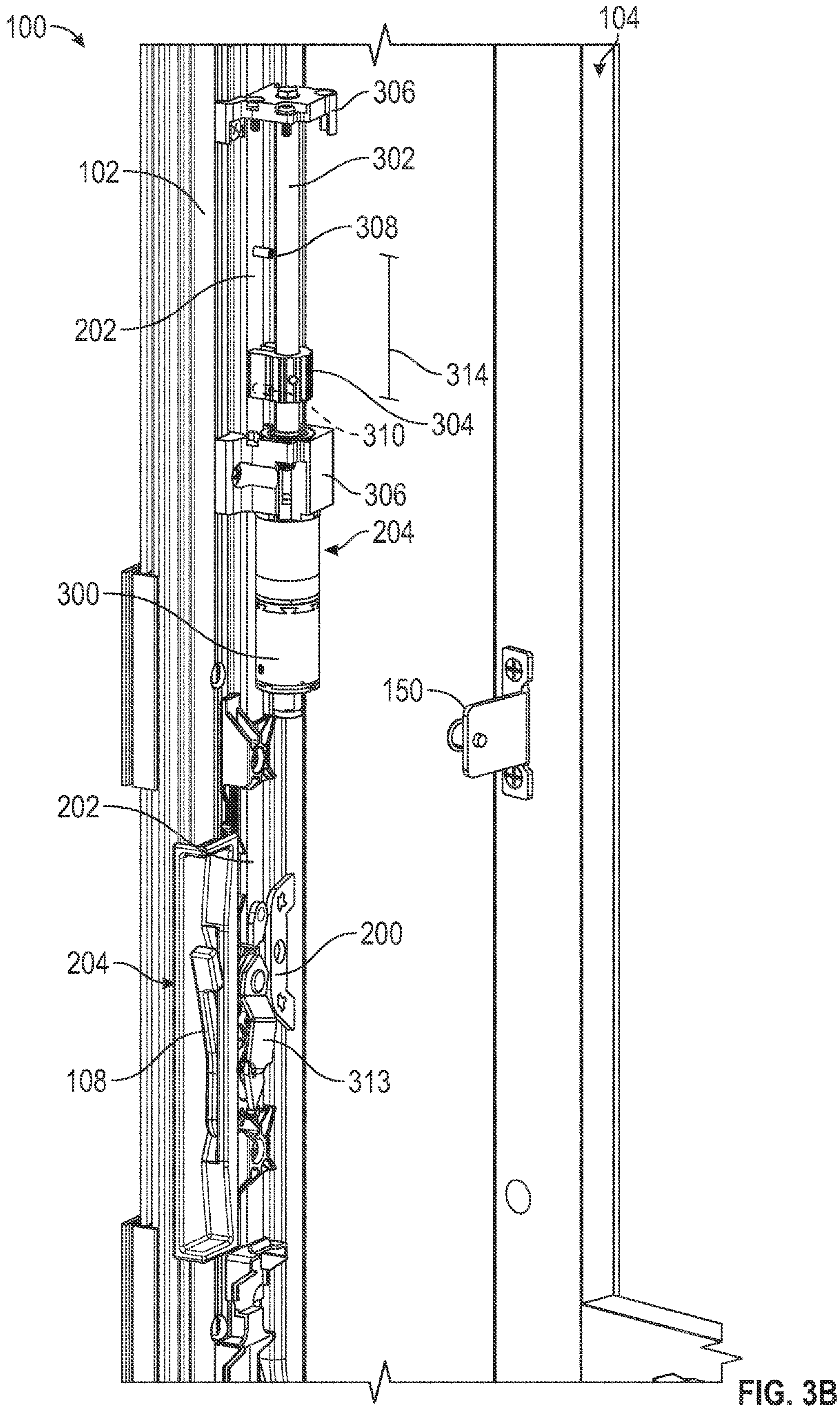
FIG. 3B is a detailed perspective view of the example of the panel latching assembly of FIG. 2 in an unlatched configuration.

FIGS. 3A and 3B provide detailed perspective views of portions of the fenestration assembly 100 including the panel latch assembly 204. The panel latch assembly 204 is shown in each of latched (FIG. 3A) and unlatched (FIG. 3B) configurations. Additionally, in FIG. 3B the fenestration panel 104 is shown in an open configuration relative to the closed configuration shown in FIG. 3A.

As previously described, the panel latch assembly 204 includes a manual operator 108, such as a lever, slider or the like. As shown in FIGS. 3A and 3B, the manual operator is operatively coupled with the remainder of the panel latch assembly 204 with a latch mechanism 313, and the latch mechanism 313 is, in turn, coupled with the tie bar 202 extending between the one or more latches 200. Movement of the manual operator 108, for instance, from the position shown in FIG. 3A to the position shown in FIG. 3B, moves the latches 200 relative to the keepers 150 to decouple the latches 200 from the keepers 150. In an example, the latch mechanism 313 converts movement of the manual operator 108 (FIG. 3A to FIG. 3B) into movement (optionally converse to the movement of the manual operator 108) of the tie bar 202 and the associated latches 200. Misalignment of the latches 200 relative to the keepers 150 unlatches the fenestration panel 104 and permits opening of the fenestration panel, for instance, into an open configuration shown in FIG. 3B.

As further shown in FIGS. 3A and 3B, the panel latch assembly 204 includes automated (e.g., powered or motorized) components to automatically latch and unlatch the fenestration panel 104. As shown, the panel latch assembly 204 includes a latch actuator 300 (also referred to as a power source) such as a stepper motor, servo motor, brushed or brushless motor or the like to move one or more components of the panel latch assembly 204 that, in turn, automatically latch and unlatch the panel latch assembly 204. As shown in FIG. 3A, the latch actuator 300 is coupled with an actuator mechanism 302. The actuator mechanism 302 includes a drive lug 304 moveably positioned along the actuator mechanism 302. In one example, the actuator mechanism 302 and drive lug 304 are components of a drive system, for instance, a screw-drive, rack and pinion mechanism, scissor drive, belt or chain drive, gears, levers, rachets and pawls, direct motor driven assemblies, pneumatic and hydraulic and electromechanical cylinders and pistons, cams and cam followers or the like. In the example shown in FIGS. 3A and 3B the actuator mechanism 302 includes a screw-drive, and rotation of the actuator mechanism 302 (a threaded rod, screw or the like) with the latch actuator 300 correspondingly moves the drive lug 304 (a threaded nut, shuttle or the like) along the actuator mechanism 302.

As further shown in FIG. 3A, the tie bar 202 extending between the latches 200 of the fenestration assembly 100 includes one or more lugs 308, 310 proximate to the actuator mechanism 302 and the drive lug 304. In the example shown in FIGS. 3A and 3B, the lugs provided along the tie bar 202 include a latching lug 308 and an unlatching lug 310. As described herein, movement of the drive lug 304 along the shuttle track 314 and between the latching lug 308 and the unlatching lug 310 accordingly transitions the tie bar 202 and the associated latches 200 between the latched and unlatched configurations.

As further shown in FIGS. 3A and 3B, in one example, the actuator mechanism 302, in this example a threaded rod or screw, is supported by one or more mechanism bearing 306. The mechanism bearings 306 rotatably support the actuator mechanism 302 during rotation. Although a screw-drive type mechanism is shown in FIGS. 3A and 3B, the actuator mechanism 302 further includes other drive systems including, but not limited to, screw-drives, rack and pinion mechanisms, belt or chain drives, gears, levers, rachets, direct motor driven assemblies, pneumatic and hydraulic and electromechanical cylinders and pistons, cams, cam followers and the like. In other examples, the panel latch assembly 204 includes multiple actuator mechanisms 302 separately coupled with associated latches 200 and configured to operate each of one or more latches 200 relative to the keepers 150. In still other examples, the panel latch assembly 204, including the automated features, are optionally provided in an inverted configuration with the latches 200, latch actuator 300 and the actuator mechanism 302 coupled with the fenestration panel 104, and the keepers 150 coupled with the fenestration frame 102 (or another movable fenestration panel).

As further shown in FIGS. 3A and 3B, the environmental sensor 208 previously shown and described with regard to FIG. 2 is shown again. In another example, the fenestration assembly 100 includes a latch sensor 312. As shown, in an example, the latch sensor 312 is in proximity to the panel latch assembly 204 including, for instance, the automated components of the panel latch assembly 204. In one example, the latch sensor 312 detects movement of one or more components of the panel latch assembly 204 including movements of the tie bar 202, portions thereof such as the latching and unlatching lugs 308, 310, a magnetic puck coupled with the tie bar 202; movement of the drive lug 304, constructed with a ferrous material or having a magnetic puck; or the like. The latch sensor 312 senses movement of the drive lug 304 and accordingly senses latching or unlatching of the panel latch assembly 204. The status of the latch assembly is provided to one or more components including the control module 206 (FIG. 2), control interfaces, mobile devices or the like.

In operation, the panel latch assembly 204 in an automated configuration moves the drive lug 304 and accordingly moves the tie bar 202 and latches 200 between latched and unlatched configurations. The latch configuration is shown in FIG. 3A and the unlatched configuration is shown in FIG. 3B. Initially, the panel latch assembly 204, control module 206 shown in FIG. 2 or the like, receives one or more instructions configured to operate the panel latch assembly 204. For instance, with the latches 200 in the latched configuration shown in FIG. 3A, the fenestration assembly 100, such as the control module 206, receives an unlatching instruction. Upon receipt of the instruction, the control module 206 operates the latch actuator 300 and the associated actuator mechanism 302. The actuator mechanism 302 in turn moves the drive lug 304 from the position shown in FIG. 3A corresponding to a latched configuration toward the unlatched configuration shown in FIG. 3B. In one example, the movement of the drive lug 304 is in a first direction, such as downward. The drive lug 304 moves toward the unlatching lug 310, engages with the unlatching lug 310, and continued movement drives the unlatching lug 310 in the first direction (e.g., downward) and accordingly moves the tie bar 202 carrying the unlatching lug 310. Movement of the tie bar 202 is transmitted to the latches 200 and the latches 200 are moved to decouple or disengage from the keepers 150. Accordingly, the panel latch assembly 204 assumes the unlatched configuration, as shown in FIG. 3B, with the latches 200 decoupled from the keepers 150 and the fenestration panel 104 is freed to move to the open configuration.

Upon receipt of a latching instruction, for instance, to move the latches 200 toward the latched configuration relative to an unlatched configuration (corresponding to movement between FIG. 3B to FIG. 3A) the latch actuator 300 operates the actuator mechanism 302 moving the drive lug 304 in an upward fashion (in this example). The drive lug 304 disengages from the unlatching lug 310 and approaches the latching lug 308. Continued movement of the drive lug 304, for instance along the shuttle track 314 between the latching and unlatching lugs 308, 310, engages the drive lug 304 with the latching lug 308 and moves the latching lug and the tie bar 202 and latches 200 upwardly to couple the latches 200 with the keepers 150. The panel latch assembly 204 thereby moves the latches 200 in an automated manner to achieve the latched configuration shown in FIG. 3A.

As shown in FIGS. 3A and 3B, the positioning of the latching lug 308 and the unlatching lug 310 on the tie bar 202 with a space therebetween provides a shuttle track 314. The shuttle track 314 permits the drive lug 304 to move while disengaged from the lugs 308, 310. For instance, there is tolerance between the latching lug 308 and the unlatching lug 310 provided with the shuttle track 314. In one example, the shuttle track 314 is used to ready the fenestration assembly 100 for manual operation to latch and unlatch the fenestration assembly 100. For instance, the drive lug 304, after moving into the latched configuration shown in FIG. 3A with the drive lug 304 engaged with the latching lug 308, moves to a manual ready configuration that permits operation of the manual operator 108 in the case of an emergent situation, power outage, absence of a control device or the like. The manual tolerance configuration 316 is shown FIG. 3A with dashed lines corresponding to the position of the drive lug 304 between the latching and unlatching lugs 308, 310. As shown, the drive lug 304 (in dashed lines) is decoupled from each of the latching lug 308 and the unlatching lug 310. The tie bar 202 is accordingly free to move without interference by the latch actuator 300 and actuator mechanism 302. Instead, when manual operation is desired, the operator grasps the manual operator 108 and is readily able to move the manual operator 108 and the associated tie bar 202 and latches 200.

In one example, where manual unlatching is specified, the manual operator 108 is raised relative to the configuration shown in FIG. 3A to the configuration shown in FIG. 3B. The latch mechanism 313 translates the movement of the manual operator 108 and moves the tie bar 202 and the latches 200 coupled with the tie bar 202, and disengages the latches 202 from the keepers 150. Because the drive lug 304 is previously disengaged from the latching lug 308, movement of the tie bar 202 is not interfered with by the drive lug 304, latch actuator 300 or the actuator mechanism 302. Instead, the tie bar 202 readily moves to permit decoupling of the laches 200 from the keepers 150 and thereby permits opening of the fenestration panel 104 without otherwise requiring powered movement.

In an example where power returns, the emergent situation is over or the like, automated operation of the panel latch assembly 204 is readily permitted. For example, operation of the latch actuator 300 moves the drive lug 304 from the manual tolerance configuration 316 toward and into engagement with the latching lug 308, the unlatching lug 310 or the like. In various examples, the fenestration assembly 100, such as the control module 206, automatically moves the drive lug 304 to the manual tolerance configuration 316 after one or both of automated latching or unlatching to ensure the fenestration assembly 100 is readied for manual operation with the manual operator 108 at any time (e.g., when any power outage, emergent situation, or absence of a control interface or the like occurs).

Figure 4:
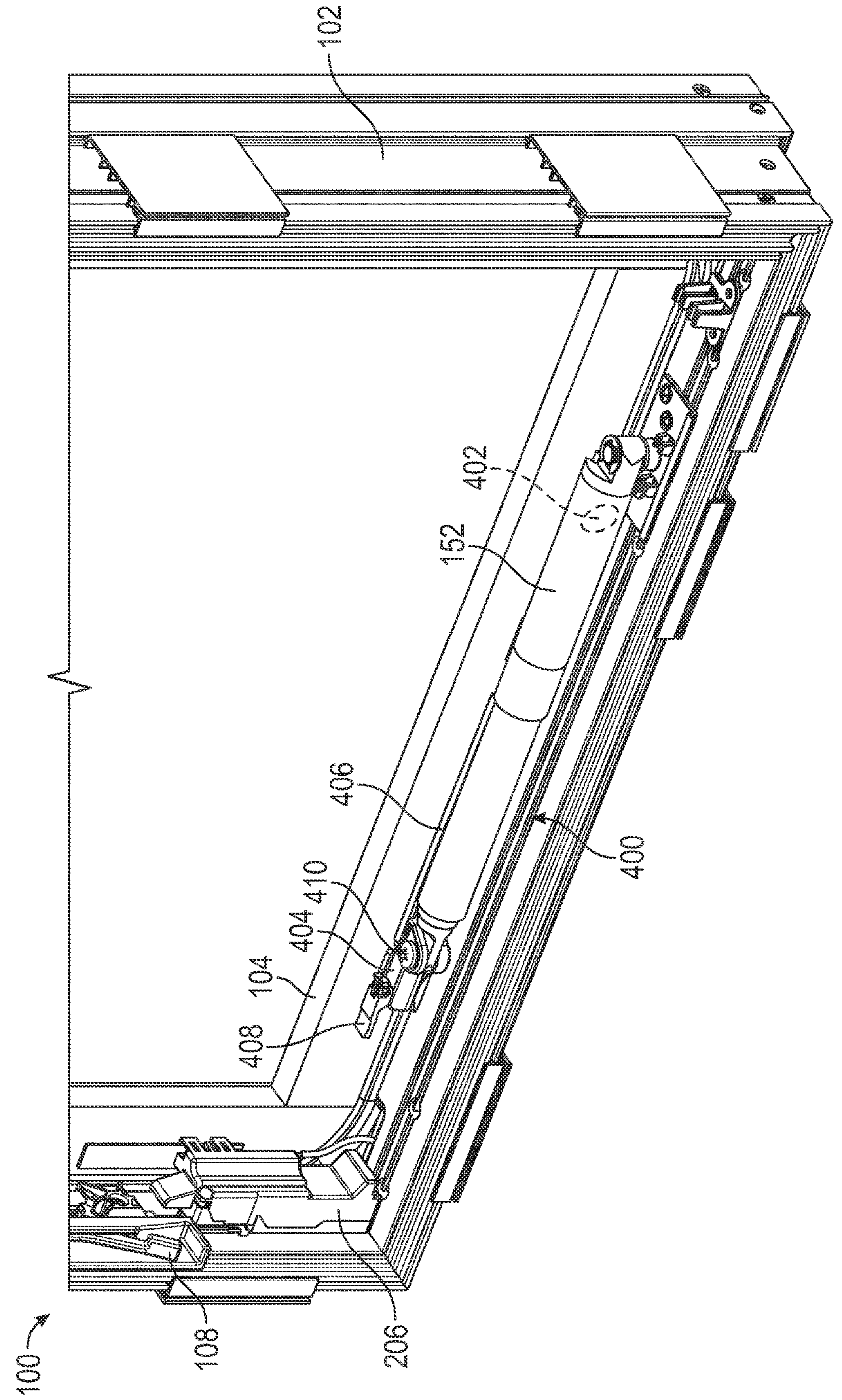
FIG. 4 is a detailed perspective view of an example of a panel operating assembly.

FIG. 4 is another perspective view of a portion of the fenestration assembly 100 with one or more of the shells removed to expose features otherwise concealed and provided within the fenestration profile of the fenestration assembly 100 (e.g., within the shape and contour of the assembly and not interfering with the shape and contour). As shown in FIG. 4, the panel actuator 152 has a compact configuration that fits within the profile of the fenestration assembly 100 and is, as shown in FIG. 1B, concealed with the operating assembly shell 112. In the example shown in FIG. 4, for instance, the operating assembly shell 112 is removed to reveal the panel operating assembly 400. The panel operating assembly 400 includes a panel actuator 152 coupled between the fenestration frame 102 and the fenestration panel 104. In this example, the panel actuator 152 is coupled with the fenestration panel 104 with a panel shoe 404. As described herein, the panel shoe 404 provides selective coupling between the panel actuator 152 and the fenestration panel 104 to permit the manual and automated opening and closing of the fenestration panel 104 with the panel operating assembly 400. The panel actuator 152 is configured to automatically open the fenestration panel 104, for instance, in one or more of an electrical, mechanical, electromechanical, pneumatic or hydraulic type operation. For instance, the panel actuator 152 includes, but is not limited to, a screw-drive, rack and pinion mechanism, plural bar linkage (e.g., scissors linkage), gears, worm drive, belt or chain drive, telescoping actuator such as a pneumatic piston or hydraulic piston or the like coupled with a power source including, but not limited to, a stepper motor, servo motor, brushed or brushless motor or other source of motive power.

In one example, the panel actuator 152 is operated in an automated fashion, for instance, by way of instructions or control provided by the control module 206. For instance, the panel actuator 152 communicates with the control module 206 with one or more of a wired or wireless connection. Upon receipt of instructions to move the panel actuator 152 and accordingly move the fenestration panel 104 between open and closed configurations including to an intermediate position therebetween, the control module 206 provides an instruction to the panel actuator 152 and the panel actuator operates to drive the fenestration panel 104 in one or more of the opening or closing directions. The panel shoe 404 includes a joint, such as a hinge joint 410, to permit articulation of the panel actuator 152 relative to the panel shoe 404, for instance, during the automated movement of the fenestration panel 104 relative to the fenestration frame 102.

In another example, the panel operating assembly 400 includes one or more breach sensors 402 configured to detect movement of the fenestration panel 104, operation of the panel actuator 152 or the like, indicative of unpowered movement of the fenestration panel 104 relative to the fenestration frame 102. For instance, in one example, with the fenestration panel 104 in the closed configuration the breach sensor 402 is configured to detect movement of the fenestration panel 104 away from the closed position (e.g., toward the open position). The breach sensor 402, in one example, senses unpowered movement of the panel actuator 152 and registers this as a potential unpermitted opening of the fenestration assembly 100. In another example, a breach sensor such as the breach sensor 158 shown in FIG. 1B is used in combination with the breach sensor 402 or is used alone to detect breaches or unpermitted opening or closing of the fenestration panel 104 without operation by the panel actuator 152. The indication of the unpermitted opening is provided to the fenestration assembly 100, for instance to the control module 206, and is relayed to a control interface (mobile device, panel or the like), alarm system or the like.

In another example, and as described herein, the panel operating assembly 400 is configured to permit manual opening and closing of the fenestration panel 104 while at the same time providing automated opening and closing functionality with the panel actuator 152. The panel shoe 404 permits the selective decoupling of the panel actuator 152 from the fenestration panel 104 to free the fenestration panel for manual movement without interference from or frustration by the panel actuator 152. In one example, a release operator 408 is provided with the panel shoe 404. The release operator 408 is operable to decouple the panel shoe 404 and the panel actuator 152 from a portion of the fenestration panel 104. While decoupled the panel shoe 404 is movable relative to a shoe track 406 provided with the fenestration panel 104 thereby permitting manual movement of the fenestration panel 104 (e.g., a movable configuration). Conversely, while the panel shoe 404 is coupled (e.g., an anchored configuration) the shoe is static relative to the panel track 406 and the fenestration panel, and operation of the panel actuator 152 causes one or more of opening or closing movement.

Figure 5:
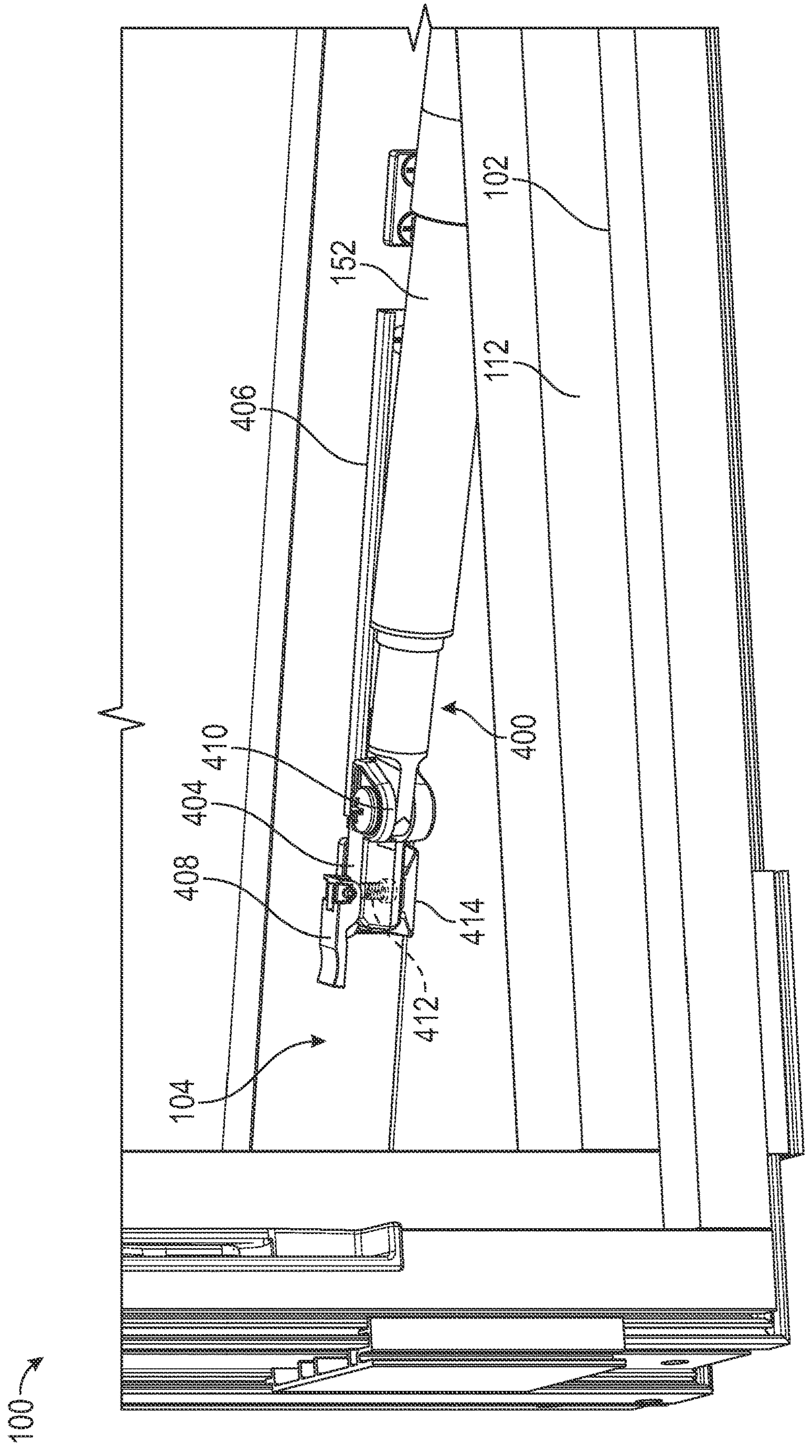
FIG. 5 is a detailed perspective view of the panel operating assembly of FIG. 4 with a fenestration panel in reveal position.

FIG. 5 shows another perspective view of the fenestration assembly 100 including the panel operating assembly 400 in a partially open configuration or reveal position with the panel shoe 404 in an anchored configuration relative to a shoe track 406. In this example, the operating assembly shell 112 is included and accordingly shows a portion of the panel actuator 152 concealed and a portion of the panel actuator 152 revealed for instance to provide access to the release operator 408 to initiate manual operation of the fenestration panel 104 relative to the fenestration frame 102.

In one example, the shoe track 406 includes an anchor socket (optionally a component of an anchor guide 414 associated with the shoe track) configured to provide an amount of tolerance between an anchor of the panel shoe 404 and the socket to permit some relative movement between the panel shoe 404 and the shoe track 406 (and anchor guide 414) to permit limited outward movement of the fenestration panel 104 into the revealed position shown in FIG. 5. In the revealed position the user may access portions of the panel operating assembly 400 that are otherwise concealed by the operating assembly shell 112 with the fenestration assembly 100 is closed. As shown in FIG. 5, the tolerance of the anchor socket discussed later herein permits limited manual opening of the fenestration panel 104 while at the same time also providing access to the release operator 408 for the panel shoe 404.

Referring again to FIG. 5, a shoe anchor 412 (in broken lines) is shown with the panel shoe 404. The release operator 408 is configured to move the shoe anchor 412 relative to the anchor guide 414. For instance, actuation of the release operator 408 decouples the shoe anchor 412 from the anchor socket of the anchor guide 414 of the shoe track and thereby transitions the panel shoe 404 to a movable configuration relative to the fenestration panel 104. In one example, a shoe track 406 is provided along a portion of the fenestration panel 104. With the panel shoe 404 decoupled from the anchor socket (e.g., the shoe track 406 including the optional anchor guide 414), the panel shoe 404 is in the movable configuration and slidably moveable along the shoe track 406.

Figure 6A:
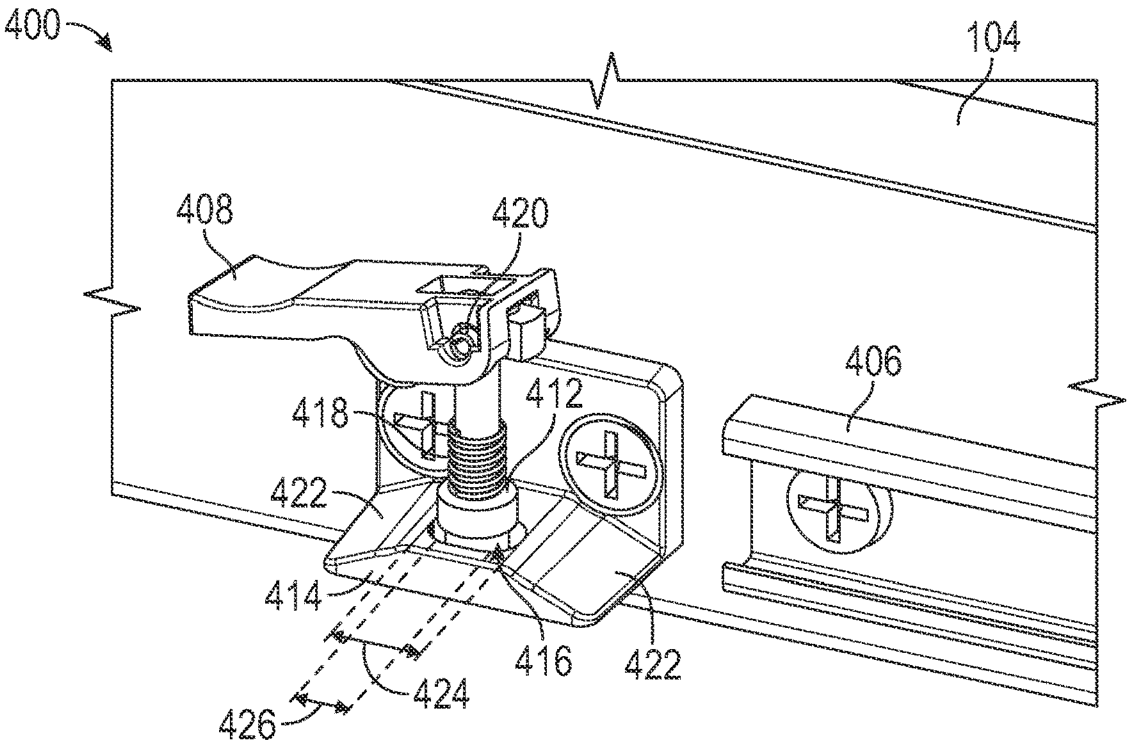
FIG. 6A is a detailed perspective of a portion of the panel operating assembly including a shoe anchor.
Figure 6B:
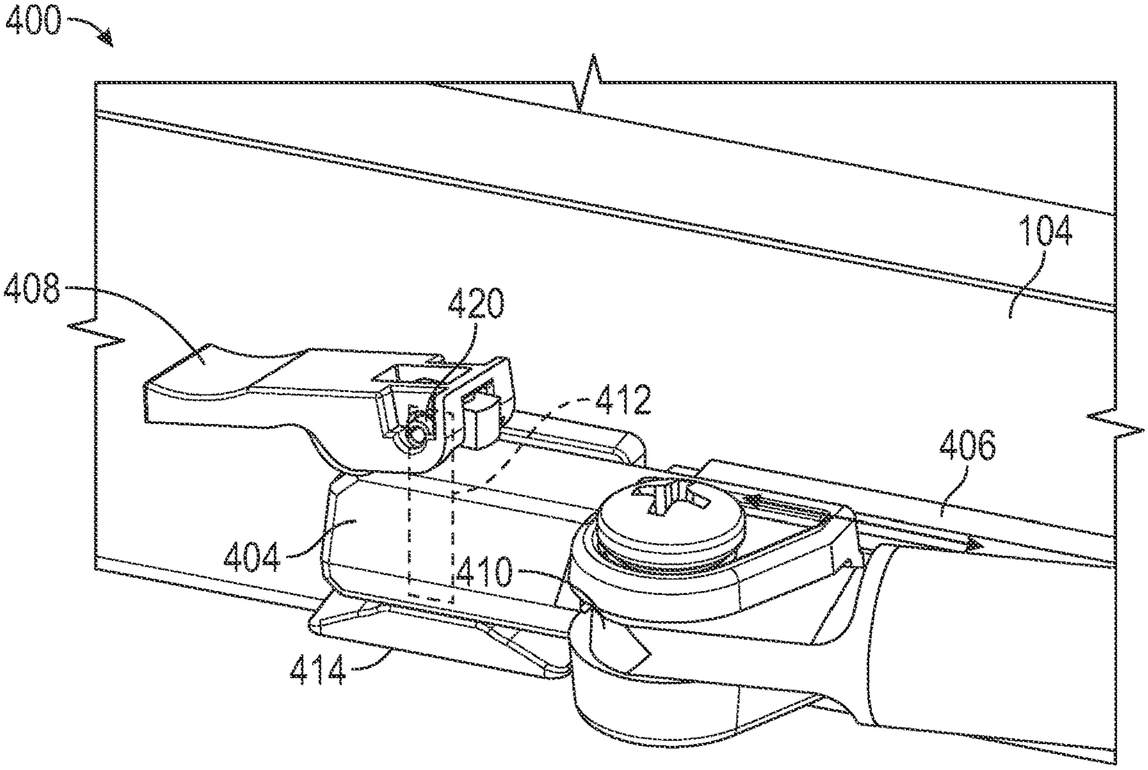
FIG. 6B is a detailed perspective of a portion of the panel operating assembly including with the panel shoe in a moveable configuration.

FIG. 6A shows a detailed view of a portion of the panel operating assembly 400 including the release operator 408, the shoe anchor 412, the anchor guide 414 and the shoe track 406. The panel shoe 404 is removed in FIG. 6A (but shown in FIG. 5) to clearly illustrate the shoe anchor 412 and its profile relative to the anchor socket 416. The release operator 408 is shown in an unseated or release position relative to the anchor guide 414 and the anchor socket 416. In the example shown, the release operator is tilted or pivoted around a pivot joint 420. The release operator 408 engages with an upper surface of the panel shoe 404 in the manner of a lever and accordingly biases the shoe anchor 412 (e.g., a pin, rod or the like) while overcoming a counter bias otherwise provided by a biasing element 418, such as a coil spring. The movement of the shoe anchor 412 into the retracted configuration shown in FIG. 6A unseats the shoe anchor 412 or decouples the shoe anchor relative to the anchor socket 416. Decoupling of the shoe anchor 412 accordingly decouples the panel shoe 404 from the anchored configuration. Instead, the panel shoe 404, shown in FIG. 6B, is in a movable configuration and slidable relative to the shoe track 406 thereby permitting manual opening and closing of the fenestration panel 104. Release of the release operator 408 accordingly allows the biasing element 418 to bias the shoe anchor 412 to a depressed or initial configuration with the shoe anchor 412 projecting from the bottom of the panel shoe 404. Closing movement of the fenestration panel 104 moves the slidable panel shoe 404 along the shoe track 406 distally toward the anchor guide 414 and the anchor socket 416. Continued movement of the panel shoe 404 along the shoe track 406, for instance over the guide surfaces 422 of the anchor guide 414 deflects the shoe anchor 412 and it reseats in the anchor socket 416 thereby transitioning the panel shoe 404 to the anchored configuration shown in FIGS. 4 and 5.

Referring again to FIG. 6A, the anchor socket 416, in this example, includes a manual tolerance 424. The manual tolerance 424 is shown with the dimensional lines provided in FIG. 6A. The shoe anchor 412, such as a pin, rod or the like, is also shown with its anchor profile 426 using dimensional lines. The anchor profile 426 is smaller than the manual tolerance 424 of the anchor socket 416. The difference between the manual tolerance 424 and anchor profile 426 permits limited relative movement between the shoe anchor 412 and the anchor guide 414 while the shoe anchor 412 is seated within the anchor socket 416. In one example, the limited movement permitted by the manual tolerance 424 and the anchor profile 426 permits limited manual movement of the fenestration panel 104, such as the manual movement shown in FIG. 5. For instance, in one example, the anchor socket includes a dimension of approximately a quarter of an inch while the shoe anchor 412 is approximately an eighth of an inch. With the difference between the two dimensions the shoe anchor 412 is permitted to laterally move within the anchor socket 416 before contacting an engagement surface of the socket (e.g., formed by the ends of the socket of the anchor guide 414), The lateral movement permitted between the seated shoe anchor 412 and the anchor socket 406 permits limited rotational motion of the fenestration panel 104 relative to the fenestration frame 102. This limited rotational movement reveals the panel operating assembly 400 including, for instance, the release operator 408, as shown in FIG. 5. Additionally, the difference between the manual tolerance 424 and the anchor profile 426 limits additional manual rotational movement to prevent further opening of the fenestration panel 104 (e.g., to prevent undesired opening of the fenestration panel 104 by an intruder, wind or the like). Instead, the operator (the user) is permitted to move the fenestration panel 104 manually to the position shown in FIG. 5 and thereafter has access to the release operator 408 to accordingly deflect the release operator as shown in FIGS. 6A and 6B and unseat the shoe anchor 412 from the anchor slide 416 to permit full manual opening and closing movement of the fenestration panel 104 relative to the fenestration frame 102.

Figure 7:
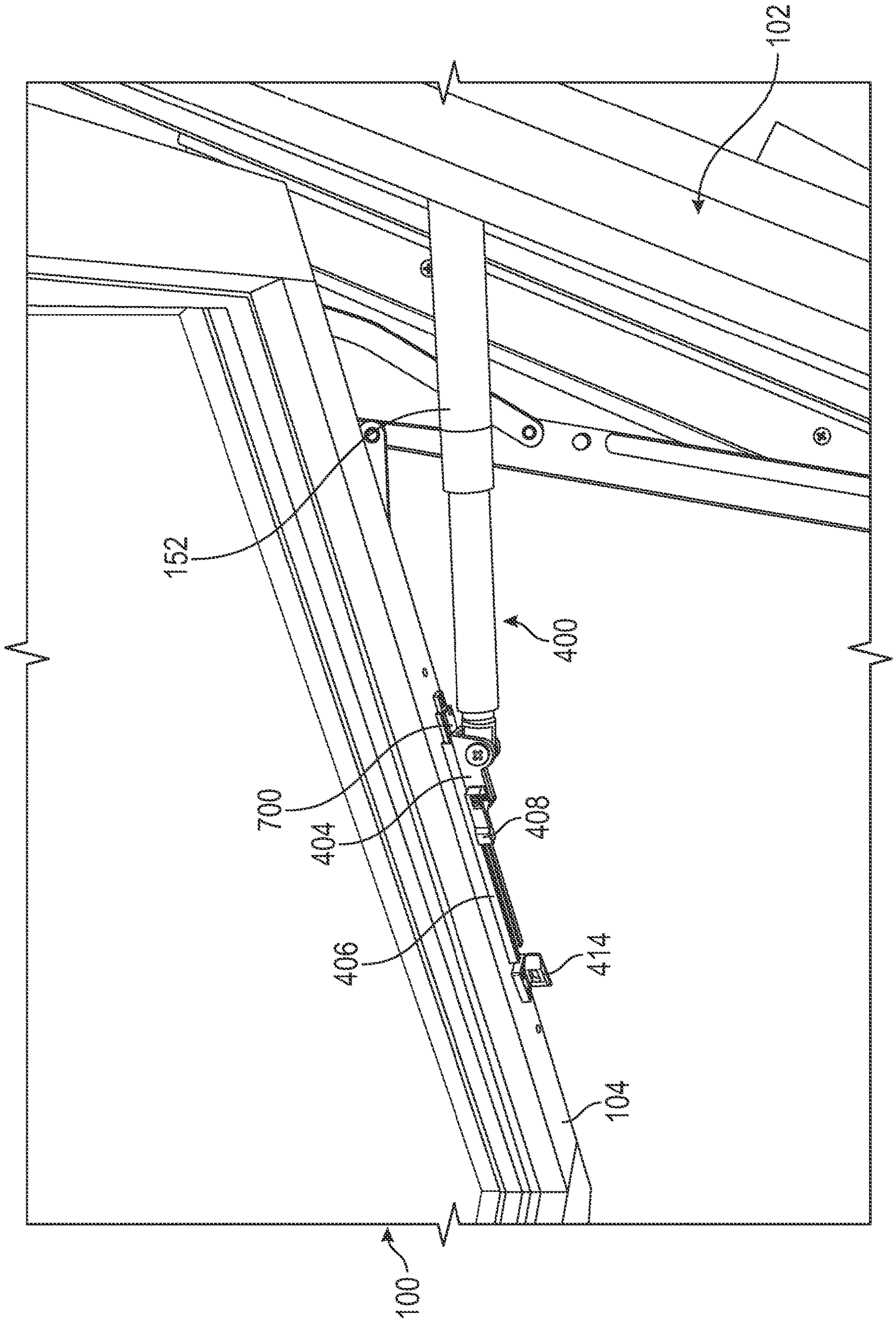
FIG. 7 is a perspective view of the panel operating assembly in a manually opened configuration.

FIG. 7 is a detailed perspective view of the fenestration assembly 100 with the panel shoe 404 in a movable configuration in comparison to the anchored configuration previously shown in FIG. 5. As previously discussed, actuation of the manual operator 408 decouples the shoe anchor 412 from the shoe track 406, for instance the anchor guide 414 having the anchor socket 406, and permits manual movement of the fenestration panel 104 that is otherwise moved automatically with the panel actuator assembly 400. With the shoe anchor 412 decoupled the panel shoe 404 is movable along the shoe track 406, for instance as the fenestration panel 104 is manually moved (e.g., from closed to open, open to closed, between intermediate positions or the like). In one example, an operator (the user) pushes or pulls on the fenestration panel 104. With the shoe anchor 412 decoupled from the anchor socket 406 the panel actuator 152 freely rotates as the panel 104 rotates because the panel shoe 404 slides along the shoe track 406 (shown with arrows in FIG. 7). The panel actuator 152 does not frustrate or interfere with the movement of the fenestration panel 104, and instead permits the ready manual movement of the panel 104.

If automated operation is specified, the user moves the fenestration panel 104, for instance in a closing direction, and the panel shoe 404 approaches the anchor guide 414. Referring again to FIGS. 6A and 6B, the panel shoe 404 travels along the anchor guide 414, and the shoe anchor 412 rides over the guide surface 422 of the of the anchor guide 414. The shoe anchor 412 is biased toward the retracted position shown in FIG. 6A with sliding movement along the guide surface 422. Continued movement of the shoe anchor, for instance with rotation of the fenestration panel 104 and movement of the panel shoe 404 along the shoe track 406 disposes the shoe anchor 412 over the anchor socket 416, and the shoe anchor seats within the socket 416 (e.g., according to bias from the biasing element 418). With the shoe anchor 412 re-seated the panel shoe 404 is in the anchored configuration. Powered operation of the panel operating assembly 400 (e.g., with the panel actuator 152) thereafter moves the fenestration panel 104 as described herein.

In another example, with the shoe anchor 412 decoupled from the anchor socket 416 and movable along the shoe track 406 the panel actuator 152 is optionally actuated to drive the panel shoe 404 along the shoe track 406 toward the anchor guide 414 and the anchor socket 416. In this example, instead of manually moving the panel 104 the panel actuator 152 is moved to re-seat the shoe anchor 412 with the anchor socket 416 and transition the panel shoe 404 from the movable configuration to the anchored configuration.

Figure 8:
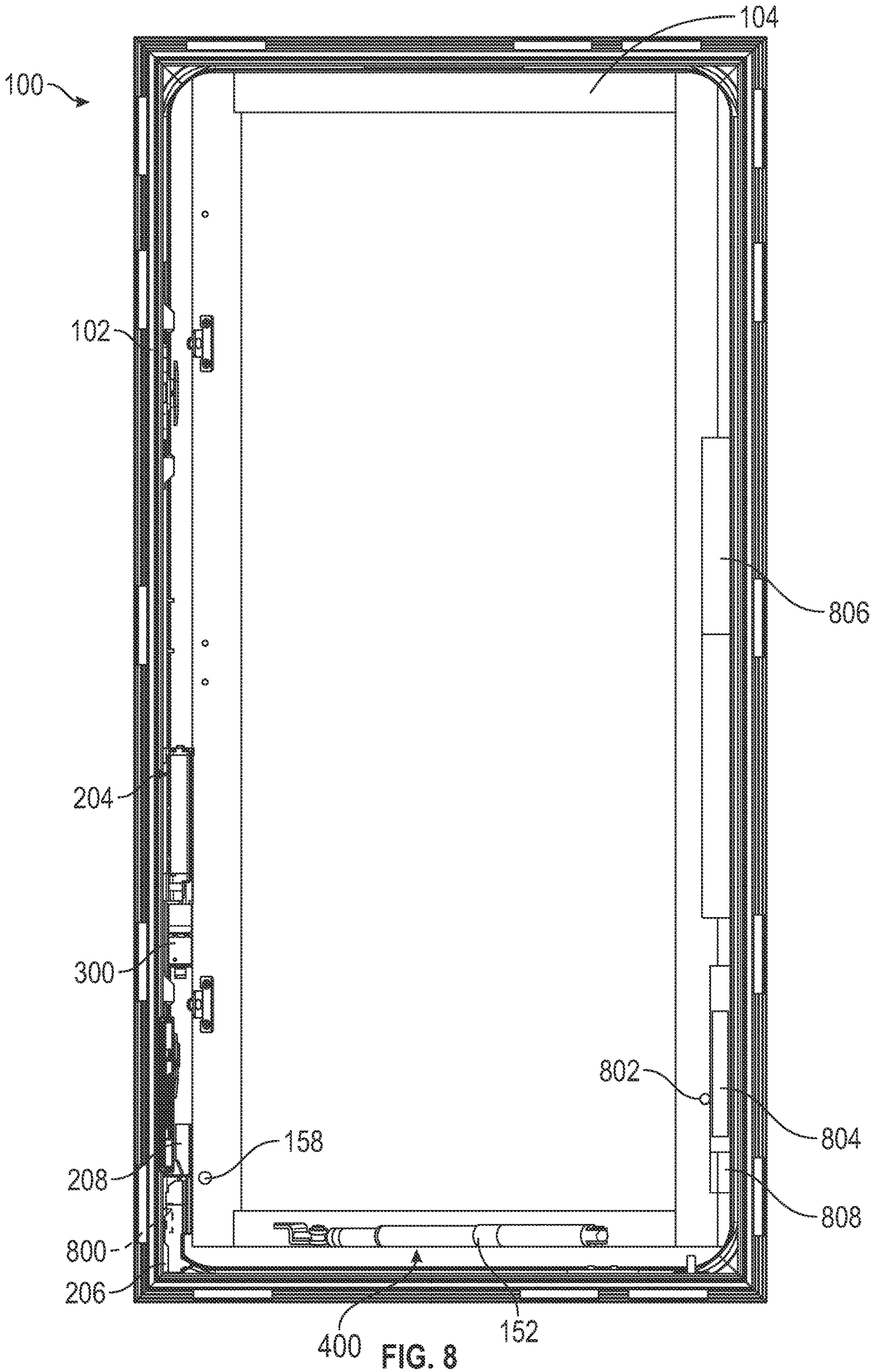
FIG. 8 is a front view of the fenestration assembly in the open configuration with one or more fenestration controllers, sensors and latch and panel actuators.

FIG. 8 is a front view of the fenestration assembly 100 including one or more processors that control securing operations, opening and closing operations, and automated operations of the fenestration assembly 100. As previously described, the fenestration assembly 100, in an example, includes a control module 206 in communication with one or more of the latch actuator 300, panel actuator 152; sensors or the like. The control module 206 includes a processor and associated components (e.g., memory, connection with sensors, wiring, boards, circuits or the like) that control the actuators receive sensory input from the sensors or the like.

In another example, the fenestration assembly 100 includes a control interface 804. The control interface 804 is shown as separate from the control module 206. Optionally, the control interface 804 is included with the control module 206 or the control module 206 is included with the control interface 804. The control interface 804, in an example, includes its own processor, memory, circuits or the like. In another example, the control module 206 includes a processor and memory, and the control interface 804 includes a communication device, and interconnections or porting for one or more other components of the fenestration assembly 100. The control interface 804 is optionally connected with one or more of the actuators, such as the panel actuator 152 or latch actuator 300, and controls the corresponding automated function (e.g., opening, closing and maintenance of panel position; latching or unlatching). In another example, the control interface 804 includes an onboard transceiver that controls transmission and reception of information (as a communication interface) between the fenestration assembly 100 and one or more components associated with the fenestration assembly including mobile devices, wall mounted control interfaces, remotes, other fenestration assemblies (e.g., for coordination of opening, closing, securing or the like), HVAC systems or the like. The control interface 804 optionally includes a communication device such as, but not limited to, a radio transceiver, Wi-Fi modem, Wi-Fi router, wired communication port (e.g., for an ethernet cable, fiber optic cable or the like) to facilitate communication between the fenestration assembly 100 and the one or more associated components. The control interface 804 permits the updating of firmware, release or refinement of functions or capabilities, enhancement or expansion of functions or capabilities or the like. In one example, one or more of the control interface 804 or control module 206 is part of an expandable architecture including CAN bus or the like, that permits the addition of different functions and capabilities with the fenestration assembly 100 including, but not limited to light modulation with actuators that operate shades, louvers, blinds, LED lighting; enhanced sensing such as, but not limited to, pressure, wind direction, temperature, ambient light, including one or both of interior or exterior sensing or the like. Additionally, the communication device of the control interface 804 as well as the sensors and processor of the interface 804 (or control module 206) permit one or more of remote diagnostics of the fenestration assembly, alerts regarding detected events (e.g., failures, breaches, environmental events such as rain or the like), as well as over the air updates (e.g., firmware; refinement, release, or enhancement of functions or capabilities or the like).

Optionally, the components of the fenestration assembly 100 that control automated operation thereof, sensors or the like are interconnected with one or more interfaces, including, but not limited to, hard wiring, wireless interconnections, a bus, CAN bus or the like. For example, each of the control module 206, control interface 804 include one or a plurality of ports (e.g., two or more) to permit selective coupling with features of the fenestration assembly 100. The ports include, but are not limited to, universal serial bus (USB), ethernet, other port formats or the like that permit one or more of communication, control of actuators, power provision or the like. The control module 206 or the control interface 804 (e.g., examples of fenestration controllers) are optionally provided with a plurality of ports to permit wired interconnection with each of the sensors, actuators, energy sources (e.g., supercapacitor, low voltage, batteries or the like) and to provide still additional ports permitting interconnection of the fenestration assembly 100 with additional sensors and features including, but not limited to, an indoor temperature sensor, outdoor temperature sensor, pressure sensors (one or more of indoor or outdoor), wind speed sensors, wind direction sensors, light sensors (one or more of indoor or outdoor), moisture sensors, actuators, shade or louver actuators, tint controllers or the like. The processor or processors provided with the control module 206 or the control interface 804 receive and distribute information between sensors, actuators, energy sources or the like according to the various interfaces (e.g., according to CAN bus formatting or the like).

In the example shown in FIG. 8, the fenestration assembly 100 includes the control module 206 and the control interface 804. The control interface 804 is coupled with an energy source, such one or more of the energy source 808 (low voltage power) to provide power to the various sensors, the control module 206, control interface 804 or the like; energy source 806, such as a supercapacitor, to provide enhanced power for actuators. In one example, the control interface 804 is coupled with the panel actuator 152 of the panel actuator assembly 400 and accordingly controls automated opening and closing of the fenestration panel 104. In another example, the control interface 804 is coupled with the control module 206, and receives instruction from the control module 206 including opening and closing commands for the panel actuator 152.

Optionally, the control interface 804 is coupled with one or more sensors, such as an unpowered movement sensor 802 (e.g., another type of breach sensor) that detects movement of the fenestration panel 104. In one example, the unpowered movement sensor 802 monitors one or both of the fenestration panel 104, the panel actuator 152 or the like to detect movement of the panel (or the actuator) in the absence of automated movement (e.g., unpowered movement). The control interface 804, control module 206 or the like (examples of fenestration controllers) are coupled with the unpowered movement sensor 802 and optionally generate alerts with regard to movement, degree of movement (e.g., from 4 inches open to 12 inches open or the like) or the like that are delivered by way of audible or visible alerts (e.g., at the fenestration assembly 100 with speakers, LED lights or the like) or are provided to associated remote devices, mobile devices (phones or tablets), wall mounted control interfaces or the like. Optionally, the associated fenestration controller for the assembly 100 or a controller for environmental systems for a building act on these alerts to close the fenestration assembly, for instance if the fenestration panel 104 is moved by wind, intruders or the like. In another example, the unpowered movement sensor 802 detects movement of the fenestration panel 104 while the breach sensor 158 detects opening of the fenestration panel 104, such as movement of the fenestration panel from the fully closed position to any open position. The unpowered movement sensor 802 includes, but is not limited to, magnetic, light, ultrasound, encoder sensors or the like coupled with one or more of the fenestration panel 104, fenestration frame 102 or panel actuator 152 to detect, and in some examples quantify, movement of the fenestration panel 104 (or actuator). In another example, the control interface 804 provides and relays information to the fenestration assembly 100 components (e.g., the control module 206) and from the components of the assembly 100 to components associated with the assembly 100, such as mobile devices, wall mounted interfaces, displays, environmental systems such as HVAC systems, other fenestration assemblies or the like.

The control module 206 includes, in one example, a motor control board having a processor configured to control the latch actuator 300 of the panel latch assembly 204. In another example, the control module 206 includes additional porting to permit intercommunication with sensors, such as the breach sensor 800, environment sensor 208 or the like.

The fenestration assembly 100 includes an energy source 808, for instance a battery, port, wiring bundle, or the like to provide power from a low voltage source including residential wiring, batteries, combination of the same, or the like. Optionally, the energy source 808 is coupled with one or more of the control module 206 or the control interface 804 to permit the distribution of power to the various actuators and sensors of the fenestration assembly. In another example, the fenestration assembly 100 includes an energy storage device, such as the energy source 806. In one example, the energy source 806 includes a capacitor, supercapacitor, battery or the like configured to charge and store energy for the fenestration assembly 100, for instance to facilitate operation of one or more of the latch actuator 300 or the panel actuator 152 in combination with low voltage power (energy source 808) or by itself in the instance of power failure, emergent situation or the like.

In operation the fenestration assembly 100 is operated in an automated manner, for instance according to control provided with one or more processors included with the control module 206, control interface 804 or the like. In one example, the environmental sensor 208 is in communication with the control module 206 and senses one or more environmental characteristics including, but not limited to, temperature, moisture, pressure, wind speed, wind direction or the like, including indoor, outdoor or both instances of each characteristic. In one example operation, upon sensing of moisture (e.g., precipitation, humidity or the like beyond a specified threshold) with the environmental sensor 208 the control module 206 initiates closing of the fenestration assembly 100 with the panel actuator assembly 400 (and optionally latching with the panel latch assembly 204), precludes automated opening of the fenestration assembly 100 if already closed, or provides an indication to a user interface that (if closed) opening of the fenestration assembly 100 is not advisable because of moisture. In another example, if one or more of exterior temperature, humidity, wind speed or the like is outside of a specified comfort range (another example of a specified threshold) for the building occupant the control module 206 initiates closing of the fenestration assembly 100. Conversely, as the control module 206 senses achievement of specified thresholds automated opening of the fenestration assembly 100 is conducted. For instance, if one or more of exterior temperature, humidity, wind speed or the like meets corresponding specified thresholds the control module 206 conducts unlatching with the panel latch assembly 204 and opening of the fenestration panel 104 with the panel actuator assembly 400. In a similar manner, upon sensing moisture, such as precipitation, falls below a specified threshold the fenestration panel 104 is opened. Further, various tiers of specified thresholds are in some examples included to graduate one or more of opening or closing of the fenestration panel 104, for instance to intermediate positions based on achieving of the tiered thresholds or based on the magnitude of deviation from thresholds.

In still other examples, one or more of the control module 206, control interface 804 or the like of the fenestration assembly 100 are in communication with a building or home environmental management system, such as a Connected Home system provided by Marvin Windows and Doors. The fenestration assembly 100 optionally senses one or more environmental or status characteristics of the assembly 100 (open, closed, intermediate status, latched or unlatched, secure or unsecure or the like) or proximate to the assembly 100 (e.g., interior, exterior environment conditions or the like), and provides the measured characteristics to the environmental management system through the control interface 804. The environment management system has its own specified thresholds and associated algorithms, generates instructions based on application of the same, distributes instructions to the fenestration assembly 100 (e.g., to the control interface), and one or more of the control module 206 or control interface 804 operates the panel latch assembly 204, panel actuator assembly 400 or the like. In various examples, operation includes conduct of algorithms based on specified thresholds in a manner similar to the operation described herein. In other examples, operation of the fenestration assembly 100 is conducted based on algorithms that coordinate one or more fenestration assemblies 100 (e.g., assemblies in different locations in a building), operation with HVAC systems such as furnaces, heat pumps, air conditioners, cooling towers, fans, air exchangers or the like.

In another example, one or more of the control module 206 or the control interface 804 are in communication with breach sensors, such as the breach sensor 800. The breach sensor 800 senses the status of the of the fenestration assembly including open, closed and optionally intermediate positions of the same. The breach sensor 800 includes a limit switch, reed switch or the like. In another example, the breach sensor 800 is associated with one or more of the actuators of the fenestration assembly 100, such as the panel actuator 152 or the latch actuator 300. In one example, the breach sensor 800 in cooperation with a fenestration controller, such as the control module 206 or the control interface 804 detects movement of the fenestration panel 104 or the actuators 152, 300 in a non-actuated condition, for instance without powered operation of the actuators 152, 300. In such an example, unpowered movement is potentially indicative of a weather related opening or closing of the assembly 100 based on pressure differential or opening of the fenestration assembly 100 by an intruder. The control module 206 or control interface 804, in an example, counters the unpowered movement of the fenestration panel 104 with powered movement to accordingly maintain the fenestration panel 104 in a specified state (e.g., a closed configuration). In another example, the control interface 804 sends an alert from the fenestration assembly 100 to a remote device, mobile device, wall mounted control interface or the like to thereby alert the user to the unpowered movement.

Figure 9:
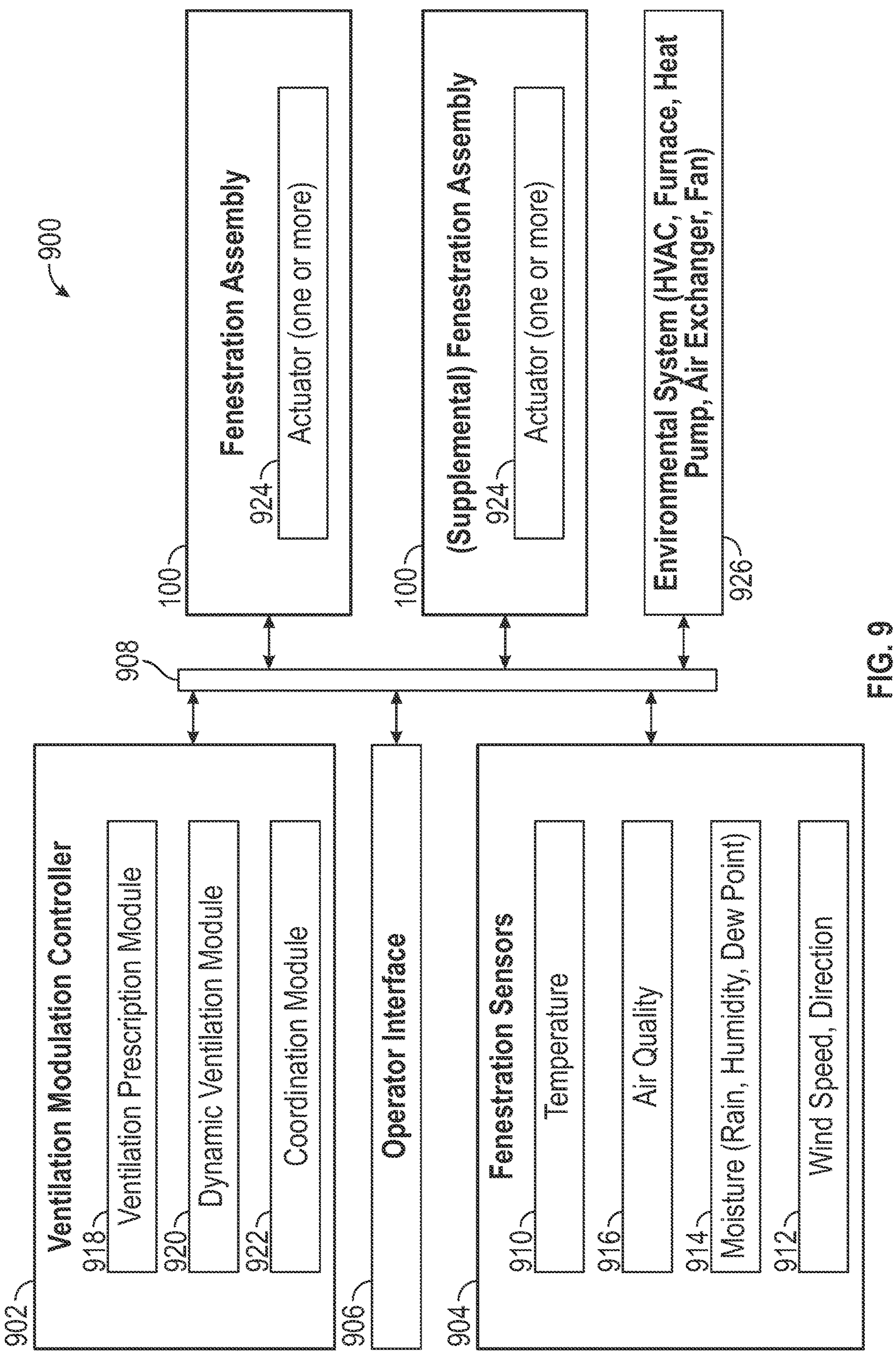
FIG. 9 is a schematic view of one example of a fenestration system.

FIG. 9 shows one example of a fenestration system 900 having one or more components previously described herein. In the example shown in FIG. 9, the system 900 includes one or more fenestration assemblies 100 of the type and similar to the fenestration assembly 100 shown herein. As shown in this example, the system 900 includes a first fenestration assembly 100 and a second or supplemental fenestration assembly 100. Each of the fenestration assemblies includes one or more actuators 924, such as the panel latch and panel operating assemblies described herein. In one example, the actuators 924 automated actuators as described herein (e.g., powered or motorized). As further shown in FIG. 9, the fenestration system 900 includes a fenestration controller 902. The fenestration controller 902, in one example, includes one or more submodules configured to modulate ventilation (e.g., conduct opening, closing and maintaining of fenestration panel 104 at intermediate positions) through the fenestration assemblies 100. The fenestration controller 902 includes one or both of the control module 206, control interface 804 as well as controllers provided with other components of the fenestration system 900 (e.g., wall mounted control panels, remote devices, mobile devices, cloud based controllers, server based controllers or the like). An operator interface 906 is shown in FIG. 9. Optionally, the operator interface 906 is in communication with the fenestration controller 902 and is used, in one example, to provide one or more specified instructions, thresholds or the like including operator prompts, specified ventilation schemes or the like for the system 900.

The fenestration controller 902 optionally includes one or more other functions in addition to or instead of ventilation control. For example, as described herein one or both of the panel latch or panel operating assemblies are operated (e.g., with the actuators 924 corresponding to the latching and panel operating actuators) after securing or closing the fenestration panel 104 to back drive the associated actuators. The back driving of the actuators provides tolerance to facilitate manual operation of the fenestration assemblies 100, for instance, in the event of a power failure, emergent situation, failure of the operator interface 906 or the like. Optionally, the fenestration controller 902 automatically back drives the associated actuators to provide the tolerance (see FIGS. 3A and 6A) for the respective panel latch and panel operating assemblies. The tolerances permit the manual operation of the fenestration panels, including unlatching and opening, as described herein.

Referring again to FIG. 9, the fenestration controller 902 in one example includes a ventilation prescription module 918 having one or more stored ventilation schemes, input ventilation schemes or the like. In another example, the ventilation prescription module 918 facilitates the modification, updating or addition of additional ventilation schemes. In still another example, the operator interface 906 is used as an input element or input feature configured to provide one or more ongoing prescriptions, operator prompts or the like to the ventilation prescription module 918 to modify schemes, add additional ventilation schemes or provide temporary or ongoing operator prompts to adjust operation of one or more of the fenestration assemblies 100 and accordingly adjust the ventilation for an associated zone such as a building interior, building room or the like. In another example, the operator interface 906 provides operator control instructions for the automated features of the fenestration assemblies 100 including the panel latch and panel operating assemblies including, but not limited to, instructions such as lock, unlock, open, close, open to a specified degree, back drive the latch actuator or panel actuator to facilitate manual operation as described herein or the like.

As further shown in FIG. 9, the fenestration controller 902 includes, in another example, a dynamic ventilation module 920. The dynamic ventilation module 920 coordinates with one or more of the actuators (e.g., panel latch, panel operating assemblies or both) associated with the fenestration assemblies 100 to open and close the panels 104 to initiate and control ventilation according to the ventilation prescriptions stored or input to the ventilation prescription module 918.

Figure 10A:
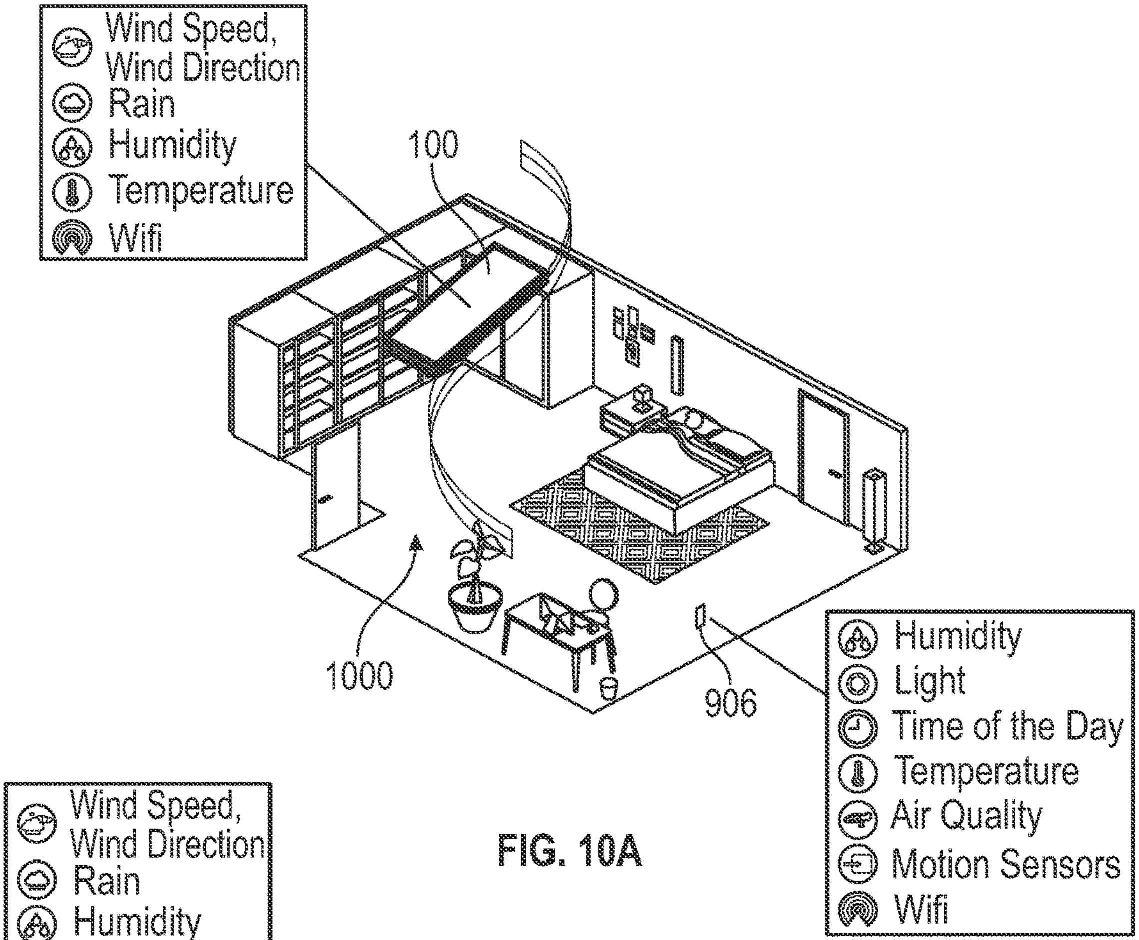
FIG. 10A is a schematic view of one example of a building zone and an example operation of a fenestration assembly.

In another example, the fenestration controller 902 includes a coordination module 922. The coordination module 922 receives one or more characteristics of the fenestration assemblies 100, for instance, detected open and closed conditions, position of the panels 104 (e.g., closed, open or intermediate positions therebetween). The coordination module 922, in one example, cooperates with the ventilation prescription module and dynamic ventilation module 918, 920 to coordinate the opening of one or more of the fenestration assemblies 100 while another fenestration assembly 100 associated with the system is open. For instance, as shown in FIGS. 10A, B one or more sensor assemblies, such as environmental sensors are associated with fenestration assemblies 100 including, but not limited to, a door or window. In one example, the fenestration system 900 (e.g., as a component of a building service system) is configured to operate one or more additional fenestration assemblies 100, for instance, a fenestration assembly 100 associated with the upper portion of the building, such as a skylight, in coordination with opening of one of the window or door of a building (e.g., another fenestration assembly). For instance, if a sash (e.g., fenestration panel 104) of a first fenestration assembly 100 is opened the coordination module 922 receives the status indicator from the corresponding environmental sensor (or breach sensor) associated with that fenestration assembly 100 and operates one of the other fenestration assemblies 100 associated with the system 900. For instance, the panel 104 of the additional fenestration assembly 100 is opened to facilitate ventilation through the building, such as a draft between each of the open fenestration assemblies 100. The coordination module 922 enhances the ventilation provided by one or more of the fenestration assemblies 104 by coordinating opening and closing with additional fenestration assemblies 100 associated with the fenestration system 900.

In another example, the fenestration system 900 includes one or more environmental systems 926. The environmental systems 926 include, but are not limited to, one or more environmental conditioning units such as a fan, furnace, air conditioning unit or one or more other devices such as a heat pump, geothermal heating or cooling unit or the like. Optionally, the ventilation modulation controller 902 coordinates the operation of one or more of the environmental systems 926 with one or more of the fenestration assemblies 100 in a manner similar to coordination between operation or opening of the fenestration assemblies as previously described hereinabove. For instance, on a warm day operation of the environmental conditioning unit (e.g., a first operational status of an air conditioning unit, such as running or operating) is provided to the coordination module 922. The coordination module 922 accordingly operates a fenestration assembly 100 associated with an upper portion of a home (e.g., a skylight, upper floor window or the like). Operation of the fenestration assembly 100, for instance, through the actuator (or actuators 924) is automatically controlled by the coordination module 922 to coincide with the operation of the air conditioner. Accordingly, as cool air is delivered to the house the fenestration assembly 100 is opened with the actuators 924 (e.g., the panel latch and panel operating assemblies) to exhaust heated air otherwise trapped in the building. Conversely, with cessation of operation (e.g., a second operational status, for instance including a blower shut off or the like) the coordination module 922 optionally initiates closing of the fenestration assembly 100 with the actuators 924, for instance to prevent the escape of cooler air. In another example, the fenestration assembly 100 is left open to facilitate additional exhaust of warm air as the warm air rises to the fenestration assembly 100.

As further shown in FIG. 9, the fenestration system 900 includes one or more fenestration sensors 904 associated with the system 900. The fenestration sensors 904 include, but are not limited to, environmental sensors 208 as shown in FIGS. 2, 3A and 8, such as one or more sensors configured to measure, determine or sense temperature, air quality, moisture (e.g., precipitation), humidity, dew point, one or more wind characteristics such as wind speed, wind direction, pressure or the like to the exterior or interior of the assembly 100 (or both). As shown in FIG. 9, the fenestration sensors 904 include one or more of a temperature sensor 910 or a wind characteristic sensor 912 configured to measure one or more of wind speed, wind direction or the like. In another example, the sensors 904 include an air quality sensor 916, for instance, configured to measure one or more particulate types (e.g., parts per million), contaminants or the like in the air such as the air surrounding the building. In still another example, the one or more fenestration sensors 904 include moisture sensors configured to measure one or more of exterior humidity, dew point, precipitation or the like. Optionally, the moisture sensor 914 (or any of the sensors described herein) is, in one example, associated with an interior portion of the building and accordingly determines the humidity (or other characteristic) of the interior spaces associated with the fenestration system 900. Optionally, the system 900 determines a humidity or temperature difference between the exterior environment and the interior environment of the building and initiates ventilation (opening of the fenestration assemblies) based on the humidity or temperature difference (or both), for instance opening the assemblies if the exterior humidity or temperature is lower than the interior humidity or temperature.

In another example, fenestration system 900 includes one or more comfort parameters corresponding to exterior conditions that are considered comfortable. In some examples, the comfort parameters vary (sometimes significantly) from interior conditions that are considered comfortable (e.g., room temperature). The comfort parameters, in one example, include a range of temperatures, humidity, wind speed or combinations of the same that are considered comfortable to an occupant when outside. The sensors 904 monitor these exterior conditions, and upon detection of exterior characteristics approaching or satisfying the comfort parameters the ventilation modulation control 902 operates one or more of the fenestration assemblies 100 (the actuators 924) to open the assemblies and accordingly bring the exterior conditions into the building. In one example, the fenestration assemblies 100 and the fenestration system 900 permit the virtual creation of an exterior comfortable environment within the building interior.

As further shown in FIG. 9, an interface 908 interconnects each of the various components of the fenestration system 900. In one example, the interface 908 includes a hardwired connection between the one or more components including, for instance, a series of Ethernet connections between each of the one or more components. In such an example, Ethernet cables are run to each of the fenestration assemblies 100, the controller 902 as well as one or more of the operator interface 906 and fenestration sensors 904. Optionally, the fenestration sensors 904 are associated with one or more of the fenestration assemblies 100 or one or more other components of the system 900. For example, the fenestration sensors 904 (environmental sensors, breach sensors or the like) are installed with the fenestration assemblies 100. In some examples, the fenestration sensors 904 are remote relative to the remainder of the system 900 including a weather service, remote sensors or the like, and interconnect with wired or wireless connections. In still other examples, components of the fenestration assemblies 100, such as the actuators 924, sensors 904 (when present with the assemblies 100), controllers or the like are interconnected with an expandable architecture, such as a bus, CAN bus or the like that permits further refinement of the fenestration assemblies 100, for instance to include light modulating elements including, but not limited to, LED lighting, shades, louvers, blinds or the like and the associated actuators for the same.

In another example, each of the components, such as the controller 902, operator interface 906, sensors 904, fenestration assemblies 100 and environmental systems 926, are interconnected with one or more wireless connections including, but not limited to, wireless connections provided by a wireless modem, network or the like (Bluetooth, IEEE 802.11 standard, near field, infrared, radio frequency or the like). The interface wirelessly interconnects each of the components to facilitate their communication and control of one or more of the components including, but not limited to, the fenestration assemblies 100, environmental systems 926 or the like. In another example, the interface 908 includes a mixed series of interconnections. For instance, the operator interface 906 is, in one example, interconnected with the ventilation modulation controller 902 with a hardwired connection such as an Ethernet connection, bus or the like. In contrast, the fenestration assemblies 100 are, in various examples, wirelessly connected with one or more of the ventilation modulation controller 902 (or controllers, for instance provided with each fenestration assembly 100) or operator interface 906. The wireless interconnections further permit one or more of remote diagnostics to assess faults, failures or issues with the fenestration assemblies 100; detect events such as breaches or uncontrolled movement of the fenestration panels 104; or conduct over the air updates of firmware, expand or improve functions, add additional functions to the fenestration assemblies 100 or the system 900 or the like.

Figure 10B:
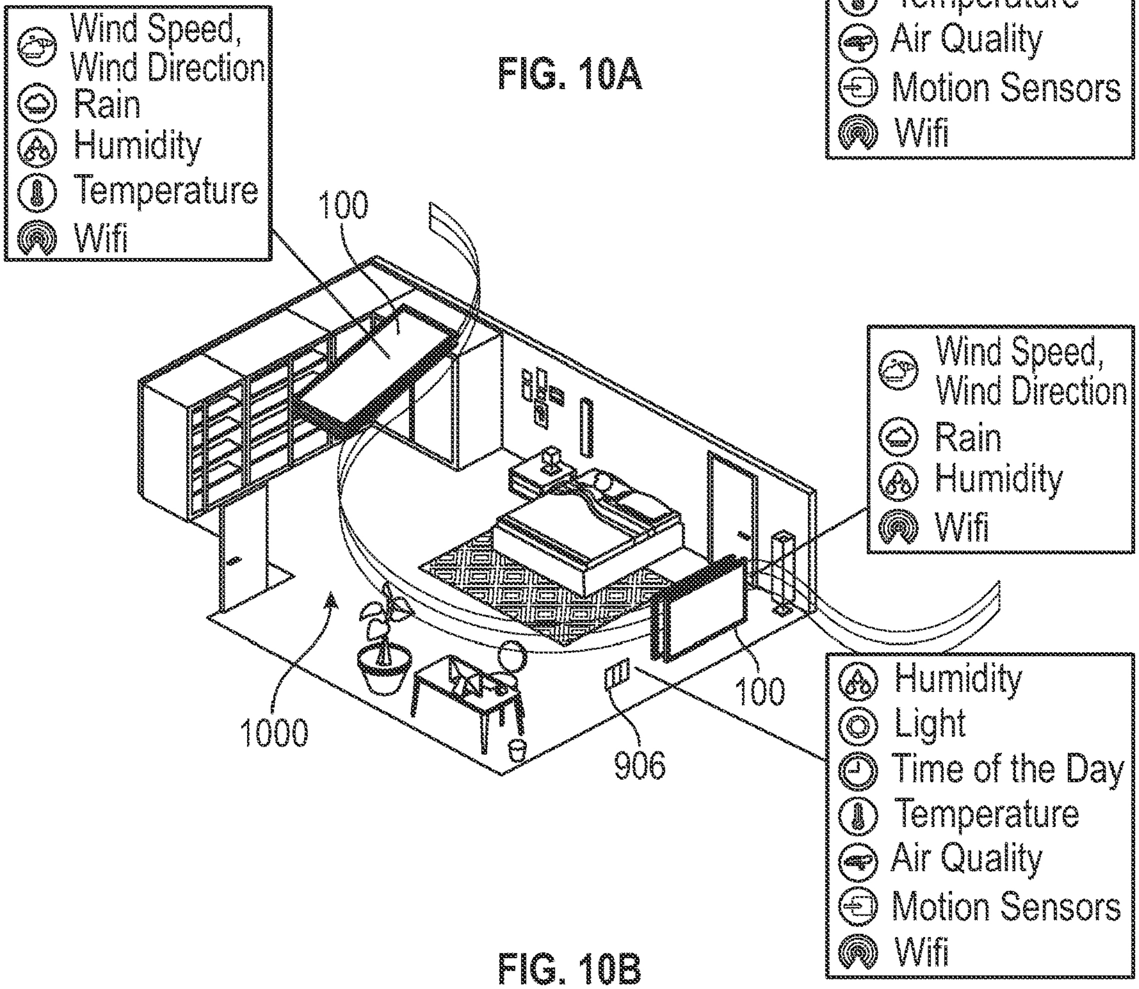
FIG. 10B is a schematic view of the building zone and an example operation of multiple fenestration assemblies.

FIGS. 10A, 10B show two example diagrams of a building zone 1000. The building zone 1000, in this example, corresponds to a room (or rooms), volume or the like, for instance a component room or space in an overall building. In the example shown in FIG. 10A, the building zone 1000 includes at least one fenestration assembly 100. The fenestration assembly 100 example includes a window, door, skylight or the like having at least one operable panel (e.g., fenestration panel 104). As further shown in FIG. 10A, the fenestration assembly 100 is in communication with an operator interface such as the operator interface 906 shown in FIG. 9. For instance, the operator interface 906 includes, but is not limited to, a thermostat, home automation controller, wireless control device for the fenestration assembly 100, tablet computer, smart phone or the like. Additionally, one or more of the features of the fenestration system 900 are included in one or more of the fenestration assembly 100 or the operator interface 906. In one example, the ventilation modulation controller 902, the operator interface 906, the interface 908 and one or more fenestration sensors 904 (e.g., environmental sensors, or the like) are included with the operator interface 906. In another example, fenestration sensors 904 (environmental, breach or the like) and the ventilation modulation controller 902 are included with the fenestration assembly 100 while the operator interface 906, in one example, is provided at a wall as shown in FIG. 10A (or 10B). In another example, the operator interface 906, shown in FIG. 9, is instead included in an application-based device such as a tablet, smartphone or the like or with a dedicated remote device.

The fenestration assembly 100 (e.g., a component of the ventilation fenestration system 900), is operated according to one or more ventilation prescriptions. In one example, the ventilation modulation controller 902 includes a warm weather ventilation prescription. For instance, with an elevated exterior temperature relative to an interior temperature of the building zone 1000 an air conditioner (an example environmental system 926) cools the building zone 1000 to a specified set point such as room temperature or comfort parameters corresponding to exterior conditions that are considered comfortable. In some examples, the comfort parameters vary from interior conditions that are considered comfortable (e.g., room temperature) and may, in an example, include a range of temperatures, humidity, wind speed or combinations of the same that are considered comfortable to an occupant when outside. In another example, warm air is accumulated in the upper portions of the building zone 1000, for instance, proximate to the fenestration assembly 100. The ventilation modulating fenestration system 900, including one or more of the modules 918-922, exhausts the accumulated heated air through opening of the fenestration assembly 100, for instance with operation of the panel latch and panel operating assemblies described herein.

Optionally, a thermometer (e.g., temperature sensor 910 of the fenestration sensors 904) is associated, in one example, with the fenestration assembly 100. For example, the thermometer is installed along the fenestration frame or proximate to the assembly 100 (e.g., along a ceiling, wall or the like). As the temperature rises proximate to the temperature sensor 910 (e.g., above a set point such as room temperature) the ventilation modulation controller 902 having the warm weather ventilation prescription opens the assembly by way of the dynamic ventilation module 920 and the operator actuators 924 (e.g., one or both of the panel latch and panel operating assemblies). Opening of the fenestration assembly 100 exhausts or vents accumulated higher temperature air in the building zone 1000 and accordingly enhances the cooling of the building zone 1000. In one example, operation of an air conditioner is minimized because heated air is exhausted and thereby not cooled with the conditioned air. In other examples, exhausting of the accumulated hot air facilitates the cooling of the building zone 1000 without operation of the environmental system 926. For instance, as heated air is exhausted through the fenestration assembly 100, a lower temperature is more readily maintained within the building zone 1000 without operation or with minimal operation of the environmental system 926.

Another example ventilation prescription is optionally stored or input to the ventilation prescription module 918. In this example prescription cooler weather, wind, breeze or the like (e.g., exterior temperature or exterior wind characteristic) is a control input for opening (and closing) of the fenestration assembly 100 with the actuators 924. For instance, with a breeze or wind greater than a specified threshold (e.g., wind speed, temperature, combination of both or the like) included in the prescription module 918 the dynamic ventilation module 920 opens the fenestration assembly 100 with the actuators 924 to institute a draft through the building zone 1000 and cool the building therein. Opening of the fenestration assembly 100 according to this prescription exhausts stagnant air from the building zone 1000 and brings exterior (comfortable) air into the zone 1000. In another example, opening the fenestration assembly 100 exhausts heated air captured near the upper portion of the building zone 1000 (e.g., in bedrooms). For instance, during the summer or winter heated air accumulates in the upper portions of a building through operation of a furnace or falling of cooled conditioned air and rising of stagnant heated air). The exhaust prescription described herein facilitates the rapid exhaustion of the heated air to provide a pleasant environment for sleeping, occupancy or the like. Optionally, the prescription compares the exterior and interior temperatures and the actuators 924 are actuated to open the assembly (or assemblies) with a sufficient deviation between the exterior and interior temperatures that satisfy a prescription. Alternatively, where comfort parameters for the exterior environment are achieved the fenestration assembly 100 is opened to permit the introduction of comfortable exterior conditions (e.g., temperature range, humidity range, wind speed or draft) to the interior environment of the building zone 1000.

In still another example, the ventilation prescription module 918 includes a prescription that bases operation of the fenestration assembly 100 (e.g., opening, closing, and intermediate positions of the panel 104) on measured humidity including dew point. In this example, if the humidity of the exterior environment measured with the moisture sensor 914 is below a specified threshold of humidity (e.g., a dew point of 55 degrees or less) the fenestration assembly 100 is opened to permit the exchange of dryer exterior air (e.g., fresh air) with the previous interior air.

In another example, enhanced humidity is specified for the building zone 1000, for instance, after continuous or near continuous operation of an air conditioner or furnace interior humidity may fall to uncomfortable levels (e.g., dew points of 45 degrees or less). In this example, the ventilation prescription initiates opening of the fenestration assembly based on an assessment of the exterior humidity relative to the interior humidity. For instance, the prescription module 918 includes an if/then rule, such as if the interior dew point is less than 45 degrees and the exterior dew point is greater than 45 degrees then the dynamic ventilation module 920 initiates opening of the fenestration assembly 100 with the actuator 924 to humidify the interior air. One or more conditions are added to the prescription in another example, including a temperature condition (e.g., if the temperature is greater than 80 degrees Fahrenheit or less than 20 degrees Fahrenheit) that overrides the opening of the fenestration assembly 100 to maintain a specified temperature in the building.

FIG. 10B shows another example of the building zone 1000 and the fenestration system 900 including a plurality of fenestration assemblies 100. In the example shown, the system 900 includes a first fenestration assembly 100 corresponding to a skylight and a second fenestration assembly 100 corresponding to a window. In other examples, the fenestration assemblies 100 include one or more doors, windows, skylights or the like.

As shown in FIG. 10B, the fenestration assemblies 100 are, in this example, coordinated to open (and optionally close) in tandem to facilitate a draft or breeze through the building zone 1000. In such an example, one or more of the fenestration assemblies 100 includes a status sensor, for instance a breach sensor as discussed herein, as one or more of the fenestration sensors 904 shown in FIG. 9. In a coordinating example, one or more of the fenestration assemblies 100, shown in FIG. 10B, is open. The fenestration sensors 904 or breach sensor detects the open status of the fenestration assembly 100. The ventilation modulation controller 902, for instance having the coordination module 922, coordinates the opening or operation of the other fenestration assembly 100 of the system 900. In this example, the fenestration assembly 100 (e.g., the skylight shown in FIG. 10B) is opened in tandem with the fenestration assembly 100 in the (sensed) open configuration. Accordingly, a draft, breeze or the like is automatically permitted through the building zone 1000.

In other examples, the fenestration system 900 includes a plurality of fenestration assemblies 100 including one or more skylights, windows, doors or the like. In various examples, these fenestration assemblies 100 are provided around a building, for instance, facing in various directions, orientations or the like. The fenestration system 900 optionally coordinates the opening of the one or more fenestration assemblies 100 to enhance the draft or breeze through one or more building zones 1000. For instance, in a scenario including a wind direction from west to east corresponding fenestration assemblies 100 are opened to enhance the draft and ventilation through the building. The fenestration system 900 includes a wind characteristic sensor 912 that detects the west to east wind direction. The ventilation modulation controller 902 accordingly coordinates, by way of the coordination module 922, the opening of corresponding fenestration assemblies 100 provided on the west and the east portions of the building. The pressure differential on the windward (west) and leeward (east) sides initiates a corresponding draft or breeze through the building. In this example with coordination of fenestration assembly 100 operation a breeze, draft or the like is permitted through the building zones 1000 that correspondingly facilitates conditioning of the interior environment.

Optionally, the ventilation prescription module 918 is configured to accept operator prompts, for instance, from the operator interface 906, shown in FIG. 9. In one example, operator prompts include, but are not limited to, operator inputs that trigger the opening or closing (including graduation of opening) of one or more of the fenestration assemblies 100 by way of the actuators 924 at user specified times during the day. For instance, in the evening after operation of a furnace during cooler periods the upper levels of a building accumulate warm air. Residents may seek to rest in the upper floors usually having bedrooms, however the accumulated warm air may frustrate rest. In this example, the ventilation modulation controller 902 automatically, or according to the operator prompts (e.g., ventilation prescription examples), opens the fenestration assemblies 100 associated with the upper portions of the building and exhausts the accumulated warm air from the upper levels. The temperature in the upper levels of the building zone 1000, for instance including bedrooms, nurseries or the like, is rapidly decreased to facilitate rest for the occupants.

In another example, one or more moisture sensors 914 are included with the fenestration assemblies 100 or are components of the fenestration system 900. In one example, the moisture sensors measure or detect precipitation (e.g., rain, snow or the like), humidity or the like. A specified precipitation threshold (rain drops per unit time, inches of precipitation, humidity or dew point or the like) is a set point included with one example of a moisture based ventilation prescription. In a scenario including rain, snow or the like that exceeds the specified precipitation or humidity threshold the dynamic ventilation module 920 automatically initiates closing of the fenestration assemblies 100 (e.g., optionally overriding other ongoing ventilation prescriptions) with the actuators 924 (panel operating assemblies) to prevent the ingress of moisture. In another example, the moisture sensors 914 are used in combination with the ventilation prescription module 918 to trigger opening, for instance, after cessation of precipitation. After the monitored precipitation or humidity falls beneath the specified precipitation threshold the dynamic ventilation module 920 automatically opens the fenestration assemblies 100 in compliance with one or more ventilation prescriptions, such as ongoing prescriptions that were previously overridden because of precipitation.

VARIOUS NOTES AND ASPECTS

Aspect 1 can include subject matter such as a fenestration automated operating system comprising: a fenestration frame; a fenestration panel movably coupled with the fenestration frame and configured to move between open and closed positions and positions therebetween; and a panel operating assembly coupled with one or both of the fenestration frame or the fenestration panel, the panel operating assembly includes: a panel actuator coupled with the fenestration frame; a fenestration controller coupled with the panel actuator, the fenestration controller is configured to operate the panel actuator to move the fenestration panel between open and closed positions; a panel shoe interposed between the panel actuator and one of the fenestration panel or the fenestration frame; and wherein the panel actuator is inside the fenestration frame at least in the closed position.

Aspect 2 can include, or can optionally be combined with the subject matter of Aspect 1, to optionally include wherein the fenestration frame includes a fenestration profile; and wherein at least the panel actuator is within the fenestration profile.

Aspect 3 can include, or can optionally be combined with the subject matter of one or any combination of Aspects 1 or 2 to optionally include a concealment shell, and the concealment shell is configured to conceal at least the fenestration controller and the panel actuator within the fenestration profile.

Aspect 4 can include, or can optionally be combined with the subject matter of one or any combination of Aspects 1-3 to optionally include wherein the panel actuator includes a telescoping actuator configured to elongate to move the fenestration panel toward the open position and contract to move the fenestration panel toward the closed position.

Aspect 5 can include, or can optionally be combined with the subject matter of one or any combination of Aspects 1-4 to optionally include wherein the panel shoe is coupled with the fenestration panel and the panel actuator.

Aspect 6 can include, or can optionally be combined with the subject matter of Aspects 1-5 to optionally include a breach sensor coupled with the panel actuator, the breach sensor is configured to detect unpowered movement of the panel actuator.

Aspect 7 can include, or can optionally be combined with the subject matter of Aspects 1-6 to optionally include a breach sensor coupled with at least one of the fenestration frame or the fenestration panel, the breach sensor is configurated to detect unpowered movement of the fenestration panel.

Aspect 8 can include, or can optionally be combined with the subject matter of Aspects 1-7 to optionally include wherein the fenestration panel includes a shoe track; and the panel shoe includes an anchored configuration and a movable configuration relative to the shoe track: in the anchored configuration a shoe anchor of the panel shoe is coupled with the shoe track, and movement of the panel shoe relative to the shoe track is limited; and in the movable configuration the panel shoe is movably coupled with the shoe track, and the movement of the panel shoe relative to the shoe track is permitted relative to the anchored configuration.

Aspect 9 can include, or can optionally be combined with the subject matter of Aspects 1-8 to optionally include wherein the panel actuator is configured to move the fenestration panel between the open and closed positions in the anchored configuration; and wherein the fenestration panel is manually movable between the open and closed positions in the movable configuration.

Aspect 10 can include, or can optionally be combined with the subject matter of Aspects 1-9 to optionally include wherein the panel shoe includes a release operator, and the release operator is configured to toggle the shoe anchor of the panel shoe between the anchored and movable configurations.

Aspect 11 can include, or can optionally be combined with the subject matter of Aspects 1-10 to optionally include wherein the shoe track includes an anchor socket having a manual tolerance and at least one engagement surface, and the manual tolerance slot is configured to receive the shoe anchor in the anchored configuration, and the manual tolerance slot is configured to permit limited relative movement of the shoe anchor relative to the shoe track in the anchored configuration relative to the movable configuration.

Aspect 12 can include, or can optionally be combined with the subject matter of Aspects 1-11 to optionally include wherein in the anchored position the shoe anchor is spaced from the at least one engagement surface with the manual tolerance.

Aspect 13 can include, or can optionally be combined with the subject matter of Aspects 1-12 to optionally include wherein the fenestration panel is manually movable to a reveal position proximate to the fenestration frame according to the manual tolerance with the shoe anchor in the anchored configuration, and in the reveal position the release operator is revealed.

Aspect 14 can include, or can optionally be combined with the subject matter of Aspects 1-13 to optionally include a breach sensor proximate to the shoe anchor, the breach sensor is configured to detect decoupling of the shoe anchor from the shoe track.

Aspect 15 can include, or can optionally be combined with the subject matter of Aspects 1-14 to optionally include wherein the panel actuator includes one or more of a screw-drive, rack and pinion drive, scissor drive, piston and cylinder drive, or worm drive; and the fenestration controller includes a processor.

Aspect 16 can include, or can optionally be combined with the subject matter of Aspects 1-15 to optionally include a fenestration automated operating system comprising: a fenestration frame; a fenestration panel movably coupled with the fenestration frame and configured to move between open and closed positions and positions therebetween; and a panel latch assembly coupled with one or both of the fenestration frame or the fenestration panel, the panel latch assembly includes: a latch movably coupled with the fenestration frame; a keeper coupled with the fenestration panel; a latch actuator coupled with the latch; a fenestration controller coupled with the latch actuator, the fenestration controller configured to operate the latch actuator to move the latch between latched and unlatched configurations; and wherein at least the latch actuator is within the fenestration frame.

Aspect 17 can include, or can optionally be combined with the subject matter of Aspects 1-16 to optionally include wherein the fenestration frame includes a fenestration profile; and wherein at least the latch actuator is within the fenestration profile.

Aspect 18 can include, or can optionally be combined with the subject matter of Aspects 1-17 to optionally include a concealment shell, and the concealment shell is configured to conceal at least the latch actuator within the fenestration profile.

Aspect 19 can include, or can optionally be combined with the subject matter of Aspects 1-18 to optionally include wherein at least the latch actuator and the fenestration controller are within a fenestration frame jamb of the fenestration frame.

Aspect 20 can include, or can optionally be combined with the subject matter of Aspects 1-19 to optionally include wherein the latch includes at least first and second latches; and the panel latch assembly includes a tie bar interconnecting the first and second latches; and wherein the latch actuator is coupled with the tie bar, and the latch actuator is configured to move the tie bar and the first and second latches between the latched and unlatched configurations.

Aspect 21 can include, or can optionally be combined with the subject matter of Aspects 1-20 to optionally include wherein the panel latch assembly includes: a latching lug coupled with the latch; an unlatching lug coupled with the latch; and wherein a shuttle track is between the latching and unlatching lugs.

Aspect 22 can include, or can optionally be combined with the subject matter of Aspects 1-21 to optionally include wherein the panel latch assembly includes an actuator mechanism coupled with the latch actuator, the actuator mechanism includes a drive lug interposed between the latching lug and the unlatching lug.

Aspect 23 can include, or can optionally be combined with the subject matter of Aspects 1-22 to optionally include wherein in the latched configuration the drive lug is in a manual tolerance position spaced from at least the latching lug.

Aspect 24 can include, or can optionally be combined with the subject matter of Aspects 1-23 to optionally include wherein the panel latch assembly includes a manual operator coupled with the latch, and movement of the manual operator is configured to: move the latch between the latched and unlatched configurations; and move one or more of the latching lug or the unlatching lug relative to the drive lug according to the manual tolerance configuration.

Aspect 25 can include, or can optionally be combined with the subject matter of Aspects 1-24 to optionally include wherein the latch actuator includes an actuator mechanism, and the anchor mechanism includes one or more of a screw-drive, rack and pinion mechanism, scissor drive, piston and cylinder or worm drive; and the power source includes one or more of a stepper motor, a servo motor, a brushed motor or a brushless motor.

Aspect 26 can include, or can optionally be combined with the subject matter of Aspects 1-25 to optionally include a fenestration automated operating system comprising: a fenestration frame; a fenestration panel movably coupled with the fenestration frame and configured to move between open and closed positions and positions therebetween; a panel operating assembly coupled with one or both of the fenestration frame or the fenestration panel, the panel operating assembly includes: a panel actuator coupled with the fenestration frame; and a panel shoe interposed between the panel actuator and one of the fenestration panel or the fenestration frame; a panel latch assembly coupled with one or both of the fenestration frame or the fenestration panel, the panel latch assembly includes: a latch movably coupled with the fenestration frame; a keeper coupled with the fenestration panel; and a latch actuator coupled with the latch; a fenestration controller in communication with the panel actuator and the latch actuator, the fenestration controller is configured to: operate the latch actuator to move the latch between latched and unlatched configurations; and operate the panel actuator to move the fenestration panel between open and closed positions.

Aspect 27 can include, or can optionally be combined with the subject matter of Aspects 1-26 to optionally include wherein at least the latch actuator and the panel actuator are concealed within the fenestration frame.

Aspect 28 can include, or can optionally be combined with the subject matter of Aspects 1-27 to optionally include a concealment shell blending with a fenestration profile of one or more of the fenestration frame or the fenestration panel, and the concealment shell conceals one or more of the latch actuator or the panel actuator.

Aspect 29 can include, or can optionally be combined with the subject matter of Aspects 1-28 to optionally include wherein the fenestration controller is concealed within the fenestration frame.

Aspect 30 can include, or can optionally be combined with the subject matter of Aspects 1-29 to optionally include wherein the fenestration controller is configured to conduct one or more of: diagnostics of the fenestration assembly; detect fault events; detect environmental events; or conduct wireless updating of the fenestration controller.

Aspect 31 can include, or can optionally be combined with the subject matter of Aspects 1-30 to optionally include an expandable interface, and wherein the fenestration controller, latch actuator and the panel actuator are interconnected components of the expandable interface.

Aspect 32 can include, or can optionally be combined with the subject matter of Aspects 1-31 to optionally include one or more fenestration sensors, and the one or more fenestration sensors are interconnected components of the expandable interface.

Aspect 33 can include, or can optionally be combined with the subject matter of Aspects 1-32 to optionally include wherein the expandable interface includes a CAN bus.

Each of these non-limiting aspects can stand on its own, or can be combined in various permutations or combinations with one or more of the other aspects.

The above description includes references to the accompanying drawings, which form a part of the detailed description. The drawings show, by way of illustration, specific embodiments in which the invention can be practiced. These embodiments are also referred to herein as "aspects" or "examples." Such aspects or example can include elements in addition to those shown or described. However, the present inventors also contemplate aspects or examples in which only those elements shown or described are provided. Moreover, the present inventors also contemplate aspects or examples using any combination or permutation of those elements shown or described (or one or more features thereof), either with respect to a particular aspects or examples (or one or more features thereof), or with respect to other Aspects (or one or more features thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method aspects or examples described herein can be machine or computer-implemented at least in part. Some aspects or examples can include a computer-readable medium or machine-readable medium encoded with instructions operable to configure an electronic device to perform methods as described in the above aspects or examples. An implementation of such methods can include code, such as microcode, assembly language code, a higher-level language code, or the like. Such code can include computer readable instructions for performing various methods. The code may form portions of computer program products. Further, in an aspect or example, the code can be tangibly stored on one or more volatile, non-transitory, or non-volatile tangible computer-readable media, such as during execution or at other times. Aspects or examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described aspects or examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as aspects, examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A fenestration automated operating system comprising:

a fenestration frame;

a fenestration panel movably coupled with the fenestration frame and configured to move between open and closed positions and positions therebetween;

a panel operating assembly coupled with one or both of the fenestration frame or the fenestration panel, the panel operating assembly includes:

a panel actuator coupled with the fenestration frame;

a fenestration controller coupled with the panel actuator, the fenestration controller is configured to operate the panel actuator to move the fenestration panel between open and closed positions;

a panel shoe interposed between the panel actuator and one of the fenestration panel or the fenestration frame;

a shoe track coupled along the fenestration panel, the panel shoe is coupled with the shoe track; and wherein the panel actuator is inside the fenestration frame at least in the closed position; and the panel shoe includes an anchored configuration and a movable configuration relative to the shoe track:

in the anchored configuration the panel shoe is coupled with the shoe track, and movement of the panel shoe relative to the shoe track is limited; and in the movable configuration the panel shoe is movably coupled along the shoe track, and movement of the panel shoe along the shoe track is permitted relative to the anchored configuration.

2. The fenestration automated operating system of claim 1, wherein the fenestration frame includes a fenestration profile; and wherein at least the panel actuator is within the fenestration profile.

3. The fenestration automated operating system of claim 2 comprising a concealment shell, and the concealment shell is configured to conceal at least the fenestration controller and the panel actuator within the fenestration profile.

4. The fenestration automated operating system of claim 1, wherein the panel actuator includes a telescoping actuator configured to elongate to move the fenestration panel toward the open position and contract to move the fenestration panel toward the closed position.

5. The fenestration automated operating system of claim 1, wherein the panel shoe is coupled with the fenestration panel and the panel actuator.

6. The fenestration automated operating system of claim 1 comprising a breach sensor coupled with the panel actuator, the breach sensor is configured to detect unpowered movement of the panel actuator.

7. The fenestration automated operating system of claim 1 comprising a breach sensor coupled with at least one of the fenestration frame or the fenestration panel, the breach sensor is configurated to detect unpowered movement of the fenestration panel.

8. The fenestration automated operating system of claim 1, wherein in the anchored configuration a shoe anchor of the panel shoe is coupled with the shoe track.

9. The fenestration automated operating system of claim 8, wherein the panel actuator is configured to move the fenestration panel between the open and closed positions in the anchored configuration; and wherein the fenestration panel is manually movable between the open and closed positions in the movable configuration.

10. The fenestration automated operating system of claim 8, wherein the panel shoe includes a release operator, and the release operator is configured to toggle the shoe anchor of the panel shoe between the anchored and movable configurations.

11. The fenestration automated operating system of claim 8, wherein the shoe track includes an anchor socket having a manual tolerance slot and at least one engagement surface, and the manual tolerance slot is configured to receive the shoe anchor in the anchored configuration, and the manual tolerance slot is configured to permit limited relative movement of the shoe anchor relative to the shoe track in the anchored configuration relative to the movable configuration.

12. The fenestration automated operating system of claim 11, wherein in the anchored position the shoe anchor is spaced from the at least one engagement surface with the manual tolerance.

13. The fenestration automated operating system of claim 11, wherein the fenestration panel is manually movable to a reveal position proximate to the fenestration frame according to the manual tolerance with the shoe anchor in the anchored configuration, and in the reveal position a release operator is revealed.

14. The fenestration automated operating system of claim 8 comprising a breach sensor proximate to the shoe anchor, the breach sensor is configured to detect decoupling of the shoe anchor from the shoe track.

15. The fenestration automated operating system of claim 1, wherein the panel actuator includes one or more of a screw-drive, rack and pinion drive, scissor drive, piston and cylinder drive, or worm drive; and the fenestration controller includes a processor.

16. A fenestration automated operating system comprising:

a fenestration frame;

a fenestration panel movably coupled with the fenestration frame and configured to move between open and closed positions and positions therebetween; and a panel latch assembly coupled with one or both of the fenestration frame or the fenestration panel, the panel latch assembly includes:

a latch movably coupled with the fenestration frame;

a keeper coupled with the fenestration panel;

a latch actuator coupled with the latch;

a fenestration controller coupled with the latch actuator, the fenestration controller configured to operate the latch actuator to automatically move the latch between latched and unlatched configurations;

a manual operator coupled with the latch, and manual movement of the manual operator is configured to manually move the latch between the latched and unlatched configurations; and wherein at least the latch actuator is within the fenestration frame.

17. The fenestration automated operating system of claim 16, wherein the fenestration frame includes a fenestration profile; and wherein at least the latch actuator is within the fenestration profile.

18. The fenestration automated operating system of claim 17 comprising a concealment shell, and the concealment shell is configured to conceal at least the latch actuator within the fenestration profile.

19. The fenestration automated operating system of claim 16, wherein at least the latch actuator and the fenestration controller are within a fenestration frame jamb of the fenestration frame.

20. The fenestration automated operating system of claim 16, wherein the latch includes at least first and second latches; and the panel latch assembly includes a tie bar interconnecting the first and second latches; and wherein the latch actuator is coupled with the tie bar, and the latch actuator is configured to move the tie bar and the first and second latches between the latched and unlatched configurations.

21. The fenestration automated operating system of claim 16, wherein the panel latch assembly includes:

a latching lug coupled with the latch;

an unlatching lug coupled with the latch; and wherein a shuttle track is between the latching and unlatching lugs.

22. The fenestration automated operating system of claim 21, wherein the panel latch assembly includes an actuator mechanism coupled with the latch actuator, the actuator mechanism includes a drive lug interposed between the latching lug and the unlatching lug.

23. The fenestration automated operating system of claim 22, wherein in the latched configuration the drive lug is in a manual tolerance position spaced from at least the latching lug.

24. The fenestration automated operating system of claim 23, wherein movement of the manual operator is configured to:

move one or more of the latching lug or the unlatching lug relative to the drive lug according to the manual tolerance configuration.

25. The fenestration automated operating system of claim 16, wherein the latch actuator includes an actuator mechanism, and the actuator mechanism includes one or more of a screw-drive, rack and pinion mechanism, scissor drive, piston and cylinder or worm drive; and the power source includes one or more of a stepper motor, a servo motor, a brushed motor or a brushless motor.

26. A fenestration automated operating system comprising:

a fenestration frame;

a fenestration panel movably coupled with the fenestration frame and configured to move between open and closed positions and positions therebetween;

a panel operating assembly coupled with one or both of the fenestration frame or the fenestration panel, the panel operating assembly includes:

a panel actuator coupled with the fenestration frame; and a panel shoe interposed between the panel actuator and one of the fenestration panel or the fenestration frame;

a panel latch assembly coupled with one or both of the fenestration frame or the fenestration panel, the panel latch assembly includes:

a latch movably coupled with the fenestration frame;

a manual operator coupled with the latch, and manual movement of the manual operator is configured to manually move the latch between latched and unlatched configurations;

a keeper coupled with the fenestration panel; and a latch actuator coupled with the latch;

a fenestration controller in communication with the panel actuator and the latch actuator, the fenestration controller is configured to:

operate the latch actuator to automatically move the latch between the latched and unlatched configurations; and operate the panel actuator to automatically move the fenestration panel between open and closed positions.

27. The fenestration automated operating system of claim 26, wherein at least the latch actuator and the panel actuator are concealed within the fenestration frame.

28. The fenestration automated operating system of claim 26 comprising a concealment shell blending with a fenestration profile of one or more of the fenestration frame or the fenestration panel, and the concealment shell conceals one or more of the latch actuator or the panel actuator.

29. The fenestration automated operating system of claim 26, wherein the fenestration controller is concealed within the fenestration frame.

30. The fenestration automated operating system of claim 26, wherein the fenestration controller is configured to conduct one or more of:

diagnostics of the fenestration assembly;

detect fault events;

detect environmental events; or conduct wireless updating of the fenestration controller.

31. The fenestration automated operating system of claim 26 comprising an expandable interface, and wherein the fenestration controller, latch actuator and the panel actuator are interconnected components of the expandable interface.

32. The fenestration automated operating system of claim 31 comprising one or more fenestration sensors, and the one or more fenestration sensors are interconnected components of the expandable interface.

33. The fenestration automated operating system of claim 31, wherein the expandable interface includes a CAN bus.

34. The fenestration automated operating system of claim 26, wherein the fenestration panel includes a shoe track, the panel shoe is coupled along the shoe track, and wherein the panel shoe includes an anchored configuration and a movable configuration:

in the anchored configuration the panel shoe is coupled with the shoe track, and movement of the panel shoe relative to the shoe track is limited; and in the movable configuration the panel shoe is movably coupled along the shoe track, and the movement of the panel shoe along the shoe track is permitted relative to the anchored configuration.

* * * * *